United States Patent
He et al.

(10) Patent No.: US 11,971,521 B2
(45) Date of Patent: Apr. 30, 2024

(54) OPTICAL IMAGING SYSTEM

(71) Applicant: ZHEJIANG SUNNY OPTICAL CO., LTD, Ningbo (CN)

(72) Inventors: Lingbo He, Ningbo (CN); Rui Zhang, Ningbo (CN)

(73) Assignee: ZHEJIANG SUNNY OPTICAL CO., LTD, Ningbo (CN)

( * ) Notice: Subject to any disclaimer, the term of this patent is extended or adjusted under 35 U.S.C. 154(b) by 829 days.

(21) Appl. No.: 17/034,643

(22) Filed: Sep. 28, 2020

(65) Prior Publication Data

US 2021/0026107 A1    Jan. 28, 2021

Related U.S. Application Data

(63) Continuation of application No. PCT/CN2019/099416, filed on Aug. 6, 2019.

(30) Foreign Application Priority Data

Nov. 26, 2018 (CN) .......................... 201811417030.7

(51) Int. Cl.
*G02B 13/00* (2006.01)
*G02B 9/34* (2006.01)

(52) U.S. Cl.
CPC ............. *G02B 13/004* (2013.01); *G02B 9/34* (2013.01)

(58) Field of Classification Search
CPC ......... G02B 13/004; G02B 9/34; G02B 13/18
USPC .......................................................... 359/781
See application file for complete search history.

(56) References Cited

U.S. PATENT DOCUMENTS

| 5,193,028 A | 3/1993 | Noguchi |
| 2019/0179122 A1* | 6/2019 | Zhang ...................... G02B 9/64 |

FOREIGN PATENT DOCUMENTS

| CN | 105372787 A | 3/2016 |
| CN | 106680976 A | 5/2017 |
| CN | 107300756 A | 10/2017 |
| CN | 107807438 A | 3/2018 |
| CN | 108008525 A | 5/2018 |
| CN | 207473174 U | 6/2018 |

(Continued)

OTHER PUBLICATIONS

International Search Report issued in corresponding International Application No. PCT/CN2019/099416, mailed Nov. 13, 2019, pp. 1-2, China National Intellectual Property Administration, Beijing, China.

*Primary Examiner* — Wyatt A Stoffa
*Assistant Examiner* — Mitchell T Oestreich
(74) *Attorney, Agent, or Firm* — HAUPTMAN HAM, LLP

(57) ABSTRACT

The present disclosure discloses an optical imaging system including, sequentially from an object side to an image side along an optical axis, a first lens, a second lens, a third lens and a fourth lens. The first lens has negative refractive power, an object-side surface thereof is a convex surface, and an image-side surface thereof is a concave surface; the second lens has refractive power; the third lens has refractive power; and the fourth lens has positive refractive power, an object-side surface thereof is a convex surface, and an image-side surface thereof is a concave surface. A wavelength $\lambda$ of a chief ray of the optical imaging system and a tangent $\tan \theta$ of a half field-of-view of the optical imaging system satisfy $0.5\ \mu m < \lambda * \tan \theta < 1.0\ \mu m$.

20 Claims, 8 Drawing Sheets

(56) References Cited

FOREIGN PATENT DOCUMENTS

| CN | 208076814 U | 11/2018 |
| CN | 109298511 A | 2/2019 |

\* cited by examiner

OPTICAL IMAGING SYSTEM

CROSS-REFERENCE TO RELATED APPLICATIONS

The present patent application is a continuation of International Application No. PCT/CN2019/099416, filed on Aug. 6, 2019, which claims priority to Chinese Patent Application No. 201811417030.7, filed before the China National Intellectual Property Administration (CNIPA) on Nov. 26, 2018. Both of the aforementioned patent applications are hereby incorporated by reference in their entireties.

TECHNICAL FIELD

The present disclosure relates to an optical imaging system, and more specifically, relates to an optical imaging system including four lenses.

BACKGROUND

With the renewal of the chip, such as photosensitive Charge-Coupled Device (CCD) or Complementary Metal-Oxide Semiconductor (CMOS) elements, its application fields have expanded to infrared imaging, distance detection, infrared recognition and other fields. At the same time, with the continuous development of the portable electronic products, corresponding requirements have been put forward for the miniaturization of the optical imaging system applicable to the portable electronic products.

The current miniaturized optical imaging system usually has a larger aperture number Fno (i.e., the total effective focal length of the lens assembly divided by the entrance pupil diameter of the lens assembly), and a small amount of light input per unit time will lead to poor imaging effects in the case of insufficient light. There is a need for an optical imaging system that has the characteristics of miniaturization and large aperture, and can perform imaging in the infrared wavelength band, so as to ensure the application of the optical imaging system in detection, identification and other fields.

SUMMARY

The present disclosure provides an optical imaging system that is applicable to portable electronic products and at least solves or partially solves at least one of the above disadvantages of the prior art.

In one aspect, the present disclosure provides an optical imaging system which includes, sequentially from an object side to an image side along an optical axis, a first lens, a second lens, a third lens and a fourth lens. The first lens may have negative refractive power, an object-side surface thereof may be a convex surface, and an image-side surface thereof may be a concave surface; the second lens has refractive power; the third lens has refractive power; and the fourth lens may have positive refractive power, an object-side surface thereof may be a convex surface, and an image-side surface thereof may be a concave surface. A wavelength $\lambda$ of a chief ray of the optical imaging system and a tangent $\tan\theta$ of a half field-of-view of the optical imaging system may satisfy 0.5 µm<$\lambda$*tan $\theta$<1.0 µm.

In one embodiment, a relative F number Fno of the optical imaging system may satisfy Fno<1.3.

In one embodiment, a center thickness CT4 of the fourth lens along the optical axis and an edge thickness ET4 of the fourth lens may satisfy 0.5<CT4/ET4<1.5.

In one embodiment, a center thickness CT2 of the second lens along the optical axis and a center thickness CT3 of the third lens along the optical axis may satisfy 0.7≤CT2/CT3≤1.7.

In one embodiment, a center thickness CT1 of the first lens along the optical axis and a spaced interval T12 between the first lens and the second lens along the optical axis may satisfy 0.5<CT1/(T12*2)<2.5.

In one embodiment, the second lens may have positive refractive power, and an effective focal length f2 of the second lens and a total effective focal length f of the optical imaging system may satisfy 0.5<f2/f≤2.5.

In one embodiment, a radius of curvature R1 of the object-side surface of the first lens and a radius of curvature R2 of the image-side surface of the first lens may satisfy 1.0<R1/R2≤2.0.

In one embodiment, a radius of curvature R7 of the object-side surface of the fourth lens and a radius of curvature R8 of the image-side surface of the fourth lens may satisfy 0<R7/R8<1.5.

In one embodiment, SAG21, being an on-axis distance from an intersection of an object-side surface of the second lens and the optical axis to a vertex of an effective half-aperture of the object-side surface of the second lens, and SAG42, being an on-axis distance from an intersection of the image-side surface of the fourth lens and the optical axis to a vertex of an effective half-aperture of the image-side surface of the fourth lens, may satisfy −1.5<SAG21/SAG42<0.5.

In one embodiment, a distance TTL along the optical axis from the object-side surface of the first lens to an imaging plane of the optical imaging system and half of a diagonal length ImgH of an effective pixel area on the imaging plane of the optical imaging system may satisfy 1.5<TTL/ImgH<2.5.

In one embodiment, a working wavelength band of the optical imaging system may be in the range of 900 nm to 1000 nm.

In another aspect, the present disclosure provides an optical imaging system which includes, sequentially from an object side to an image side along an optical axis, a first lens, a second lens, a third lens and a fourth lens. The first lens may have negative refractive power, an object-side surface thereof may be a convex surface, and an image-side surface thereof may be a concave surface; the second lens has refractive power; the third lens has refractive power; and the fourth lens may have positive refractive power, an object-side surface thereof may be a convex surface, and an image-side surface thereof may be a concave surface. A distance TTL along the optical axis from the object-side surface of the first lens to an imaging plane of the optical imaging system and half of a diagonal length ImgH of an effective pixel area on the imaging plane of the optical imaging system may satisfy 1.5<TTL/ImgH<2.5.

In yet an aspect, the present disclosure provides an optical imaging system which includes, sequentially from an object side to an image side along an optical axis, a first lens, a second lens, a third lens and a fourth lens. The first lens may have negative refractive power, an object-side surface thereof may be a convex surface, and an image-side surface thereof may be a concave surface; the second lens has refractive power; the third lens has refractive power; and the fourth lens may have positive refractive power, an object-side surface thereof may be a convex surface, and an image-side surface thereof may be a concave surface. A center thickness CT2 of the second lens along the optical axis and a center thickness CT3 of the third lens along the optical axis may satisfy $0.7 \leq CT2/CT3 \leq 1.7$.

In yet an aspect, the present disclosure provides an optical imaging system which includes, sequentially from an object side to an image side along an optical axis, a first lens, a second lens, a third lens and a fourth lens. The first lens may have negative refractive power, an object-side surface thereof may be a convex surface, and an image-side surface thereof may be a concave surface; the second lens has refractive power; the third lens has refractive power; and the fourth lens may have positive refractive power, an object-side surface thereof may be a convex surface, and an image-side surface thereof may be a concave surface. A center thickness CT1 of the first lens along the optical axis and a spaced interval T12 between the first lens and the second lens along the optical axis may satisfy $0.5<CT1/(T12*2)<2.5$.

In yet an aspect, the present disclosure provides an optical imaging system which includes, sequentially from an object side to an image side along an optical axis, a first lens, a second lens, a third lens and a fourth lens. The first lens may have negative refractive power, an object-side surface thereof may be a convex surface, and an image-side surface thereof may be a concave surface; the second lens may have positive refractive power; the third lens has refractive power; and the fourth lens may have positive refractive power, an object-side surface thereof may be a convex surface, and an image-side surface thereof may be a concave surface. An effective focal length f2 of the second lens and a total effective focal length f of the optical imaging system may satisfy $0.5<f2/f \leq 2.5$.

In yet an aspect, the present disclosure provides an optical imaging system which includes, sequentially from an object side to an image side along an optical axis, a first lens, a second lens, a third lens and a fourth lens. The first lens may have negative refractive power, an object-side surface thereof may be a convex surface, and an image-side surface thereof may be a concave surface; the second lens has refractive power; the third lens has refractive power; and the fourth lens may have positive refractive power, an object-side surface thereof may be a convex surface, and an image-side surface thereof may be a concave surface. An on-axis distance SAG21 from an intersection of an object-side surface of the second lens and the optical axis to a vertex of an effective half-aperture of the object-side surface of the second lens and an on-axis distance SAG42 from an intersection of the image-side surface of the fourth lens and the optical axis to a vertex of an effective half-aperture of the image-side surface of the fourth lens may satisfy $-1.5<SAG21/SAG42<0.5$.

The present disclosure employs a plurality of (for example, four) lenses, and the above optical imaging system has at least one beneficial effect, such as miniaturization, large aperture, high relative illumination, high image quality and the like, by rationally configuring the refractive power, the surface shape, the center thickness of each lens, and the on-axis spaced interval between the lenses and the like.

BRIEF DESCRIPTION OF THE DRAWINGS

Other features, objects, and advantages of the present disclosure will become more apparent from the following detailed description of the non-limiting embodiments with reference to the accompanying drawings. In the drawings.

DETAILED DESCRIPTION OF EMBODIMENTS

Figure 1:
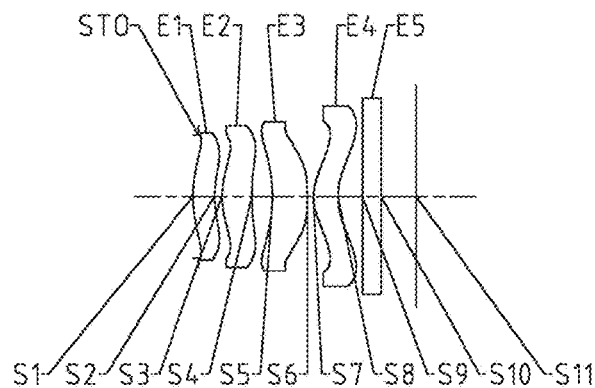
FIG. 1 illustrates a schematic structural view of an optical imaging system according to example 1 of the present disclosure.

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens discussed below may also be referred to as a second lens or a third lens without departing from the teachings of the present disclosure.

In the accompanying drawings, the thickness, size and shape of the lens have been somewhat exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is a convex surface and the position of the convex is not defined, it indicates that the surface of the lens is convex at least in the paraxial region; and if a surface of a lens is a concave surface and the position of the concave is not defined, it indicates that the surface of the lens is concave at least in the paraxial region. In each lens, the surface closest to the object is referred to as an object-side surface of the lens, and the surface closest to the imaging plane is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below.

An optical imaging system according to an exemplary embodiment of the present disclosure may include, for example, four lenses (i.e. a first lens, a second lens, a third lens and a fourth lens) having refractive power. The four lenses are arranged sequentially from an object side to an image side along an optical axis. Among the first lens to the fourth lens, there may be an air interval between each two adjacent lenses.

In an exemplary embodiment, the first lens may have negative refractive power, an object-side surface thereof may be a convex surface, and an image-side surface thereof may be a concave surface; the second lens has positive or negative refractive power; the third lens has positive or negative refractive power; and the fourth lens may have positive refractive power, an object-side surface thereof may be a convex surface, and an image-side surface thereof may be a concave surface. By reasonably configuring the refractive power and surface shape of the first lens, it may ensure that the first lens has good workability, and the imaging system has the advantage of a large field-of-view. At the same time, it is beneficial to reduce the incidence angle of the chief ray of the imaging system on the image plane, thereby increasing the relative illumination on the image plane. By configuring the fourth lens to have a convex object-side surface and a concave image-side surface, it is beneficial to ensure that the chief ray of the imaging system has a smaller incident angle when it is incident on the imaging plane, thereby increasing the relative illumination on the image plane.

In an exemplary embodiment, the optical imaging system according to the present disclosure may satisfy: Fno<1.3, where Fno is a relative F number of the optical imaging system. More specifically, Fno may further satisfy: $1.10 \leq Fno \leq 1.20$, for example, Fno=1.13. By controlling the Fno below 1.3, the energy density on the imaging plane may be effectively increased, and the signal-to-noise ratio of the image-side sensor output signal may be improved (i.e., the accuracy of infrared measurement may be improved).

In an exemplary embodiment, the optical imaging system according to the present disclosure may satisfy: $0.5$ $\mu m < \lambda * \tan \theta < 1.0 \mu m$, where $\lambda$ is a wavelength of a chief ray of the optical imaging system (in unit $\mu m$), and $\tan \theta$ is a tangent of a half field-of-view of the optical imaging system. More specifically, $\lambda$ and $\tan \theta$ may further satisfy: $0.80$ $\mu m \leq \lambda * \tan \theta \leq 0.87 \mu m$. When the conditional expression $0.5$ $\mu m < \lambda * \tan \theta < 1.0 \mu m$ is satisfied, the imaging system has a larger field-of-view and may have good image quality in the infrared wavelength band.

In an exemplary embodiment, the optical imaging system according to the present disclosure may satisfy: $1.5 < TTL/ImgH < 2.5$, where TTL is a distance along the optical axis from the object-side surface of the first lens to an imaging plane of the optical imaging system, and ImgH is half of a diagonal length of an effective pixel area on the imaging plane of the optical imaging system. More specifically, TTL and ImgH may further satisfy: $1.7 < TTL/ImgH < 2.2$, for example, $1.84 \leq TTL/ImgH \leq 2.02$. By reasonably controlling the ratio of TTL to ImgH, it is beneficial to achieve a relatively short optical total length TTL while achieving a relatively large image height, which is beneficial to achieving the miniaturization of the lens assembly and improving the image quality.

In an exemplary embodiment, the optical imaging system according to the present disclosure may satisfy: $0.5 < CT4/ET4 < 1.5$, where CT4 is a center thickness of the fourth lens along the optical axis, and ET4 is an edge thickness of the fourth lens. More specifically, CT4 and ET4 may further satisfy: $0.68 \leq CT4/ET4 \leq 1.10$. By reasonably controlling the ratio of CT4 to ET4, the processing difficulty of the lens may be effectively reduced, and the angle between the chief ray and the optical axis when the chief ray is incident on the image plane may be reduced, thereby increasing the relative illumination on the imaging plane.

In an exemplary embodiment, the optical imaging system according to the present disclosure may satisfy: $0.7 \leq CT2/CT3 \leq 1.7$, where CT2 is a center thickness of the second lens along the optical axis, and CT3 is a center thickness of the third lens along the optical axis. More specifically, CT2 and CT3 may further satisfy: $0.70 \leq CT2/CT3 \leq 1.63$. By reasonably distributing the center thicknesses of the second lens and the third lens, the lens is easy to be injection molded, the workability of the imaging system is improved, and the better image quality is advantageously ensured.

In an exemplary embodiment, the optical imaging system according to the present disclosure may satisfy: 0.5<CT1/

(T12*2)<2.5, where CT1 is a center thickness of the first lens along the optical axis, and T12 is a spaced interval between the first lens and the second lens along the optical axis. More specifically, CT1 and T12 may further satisfy: 0.7<CT1/(T12*2)<1.7, for example, 0.89≤CT1/(T12*2) ≤1.48. By reasonably configuring the center thickness of the first lens and the air interval between the first lens and the second lens along the optical axis, it is beneficial to improve the stability of the lens assembly and the consistency of mass production, which is beneficial to improving the production yield of the optical imaging system.

In an exemplary embodiment, the second lens may have positive refractive power. An effective focal length f2 of the second lens and a total effective focal length f of the optical imaging system may satisfy 0.5<f2/f≤2.5. More specifically, f2 and f may further satisfy: 0.75≤f2/f≤2.32. By reasonably controlling the ratio of f2 to f, it is beneficial to increase the field-of-view of the lens assembly.

In an exemplary embodiment, the optical imaging system according to the present disclosure may satisfy: 1.0<R1/R2≤2.0, where R1 is a radius of curvature of the object-side surface of the first lens, and R2 is a radius of curvature of the image-side surface of the first lens. More specifically, R1 and R2 may further satisfy: 1.12≤R1/R2≤1.70. By reasonably controlling the range of the ratio of R1 to R2, it is beneficial to reduce the sensitivity of the lens system, achieve the characteristics of large field-of-view, large aperture and high resolution of the imaging system, and make the first lens have good manufacturability.

In an exemplary embodiment, the optical imaging system according to the present disclosure may satisfy: 0<R7/R8≤1.5, where R7 is a radius of curvature of the object-side surface of the fourth lens, and R8 is a radius of curvature of the image-side surface of the fourth lens. More specifically, R7 and R8 may further satisfy: 0.2<R7/R8<1.2, for example, 0.25≤R7/R8≤1.09. By reasonably controlling the range of the ratio of R7 to R8, it is beneficial to ensure that the fourth lens has proper positive refractive power. At the same time, it is beneficial to reduce the angle between the chief ray and the optical axis when the chief ray is incident on the imaging plane, thereby increasing the illumination on the imaging plane.

In an exemplary embodiment, the optical imaging system according to the present disclosure may satisfy: −1.5<SAG21/SAG42<0.5, where SAG21 is an on-axis distance from an intersection of an object-side surface of the second lens and the optical axis to a vertex of an effective half-aperture of the object-side surface of the second lens, and SAG42 is an on-axis distance from an intersection of the image-side surface of the fourth lens and the optical axis to a vertex of an effective half-aperture of the image-side surface of the fourth lens. More specifically, SAG21 and SAG42 may further satisfy: −1.0<SAG21/SAG42<0.2, for example, −0.56≤SAG21/SAG42≤0.14. By reasonably controlling the ratio range of SAG21 and SAG42, it is beneficial for the chief ray of the imaging system to have a smaller incident angle when it enters the imaging plane, which increases the relative illumination of the imaging plane. Meanwhile, it is also beneficial to make the fourth lens have better processability.

In an exemplary embodiment, the optical imaging system may further include a stop to improve the image quality of the imaging system. The stop may be disposed at any position between the object side and the image side as required, for example, the stop may be disposed between the object side and the first lens.

Optionally, the above optical imaging system may further include an optical filter for correcting the color deviation and/or a protective glass for protecting the photosensitive element located on an imaging plane.

The optical imaging system according to the above embodiments of the present disclosure may employ a plurality of lenses, such as four lenses as described above. By properly configuring the refractive power of each lens, the surface shape, the center thickness of each lens, and spaced intervals along the optical axis between the lenses, the size and the sensitivity of the imaging system may be effectively reduced, and the workability of the imaging system may be improved, such that the optical imaging system is more advantageous for production processing and may be applied to portable electronic products. At the same time, the optical imaging system configured as described above may also have beneficial effects such as large aperture, high image quality, low sensitivity, and being able to image in the infrared band and the like.

A working wavelength band of the optical imaging system according to the above embodiment of the present disclosure may be a near-infrared wavelength band with a wavelength range of about 900 nm to about 1000 nm. The optical imaging system according to the present disclosure may be applied in the field of infrared cameras, and may meet the requirements for lens assemblies in applications such as detection and identification.

In the embodiments of the present disclosure, at least one of the surfaces of lenses is aspheric, that is, at least one of the object-side surface and the image-side surface of each of the first lens, the second lens, the third lens and the fourth lens is aspheric. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. With aspheric lens, the aberrations that occur during imaging may be eliminated as much as possible, and thus improving the image quality. Optionally, the object-side surface and the image-side surface of each of the first lens, the second lens, the third lens and the fourth lens are aspheric.

However, it will be understood by those skilled in the art that the number of lenses constituting the optical imaging system may be varied to achieve the various results and advantages described in this specification without departing from the technical solution claimed by the present disclosure. For example, although the embodiment is described by taking four lenses as an example, the optical imaging system is not limited to include four lenses. The optical imaging system may also include other numbers of lenses if desired.

Some specific examples of an optical imaging system applicable to the above embodiment will be further described below with reference to the accompanying drawings.

Example 1

An optical imaging system according to example 1 of the present disclosure is described below with reference to FIG. 1 to FIG. 2C. FIG. 1 shows a schematic structural view of the optical imaging system according to example 1 of the present disclosure.

As shown in FIG. 1, the optical imaging system according to an exemplary embodiment of the present disclosure includes a stop STO, a first lens E1, a second lens E2, a third lens E3, a fourth lens E4, an optical filter E5 and an imaging plane S11, which are sequentially arranged from an object side to an image side along an optical axis.

The first lens E1 has negative refractive power, an object-side surface S1 thereof is a convex surface, and an image-side surface S2 thereof is a concave surface. The second lens E2 has positive refractive power, an object-side surface S3 thereof is a convex surface, and an image-side surface S4 thereof is a concave surface. The third lens E3 has negative refractive power, an object-side surface S5 thereof is a concave surface, and an image-side surface S6 thereof is a convex surface. The fourth lens E4 has positive refractive power, an object-side surface S7 thereof is a convex surface, and an image-side surface S8 thereof is a concave surface. The optical filter E5 has an object-side surface S9 and an image-side surface S10. Light from an object sequentially passes through the respective surfaces S1 to S10 and is finally imaged on the imaging plane S11.

The working wavelength band of the optical imaging system in this example is a near-infrared wavelength band with a wavelength ranging from about 900 nm to about 1000 nm.

Table 1 shows surface type, radius of curvature, thickness, material and conic coefficient of each lens of the optical imaging system in example 1, wherein the units for the radius of curvature and the thickness are millimeter (mm).

TABLE 1

| Surface number | Surface type | Radius of curvature | Thickness | Material Refractive index | Abbe number | Conic coefficient |
|---|---|---|---|---|---|---|
| OBJ | Spherical | Infinite | 700.0000 | | | |
| STO | Spherical | Infinite | −0.0778 | | | |
| S1 | Aspheric | 1.5715 | 0.2922 | 1.53 | 56.2 | −13.8482 |
| S2 | Aspheric | 1.2365 | 0.0989 | | | −17.6665 |
| S3 | Aspheric | 1.1294 | 0.4031 | 1.63 | 20.4 | −13.8654 |
| S4 | Aspheric | 4.0414 | 0.2789 | | | −0.1462 |
| S5 | Aspheric | −1.7798 | 0.4669 | 1.53 | 56.2 | −15.3806 |
| S6 | Aspheric | −11.7739 | 0.0800 | | | 7.3531 |
| S7 | Aspheric | 0.6075 | 0.3285 | 1.63 | 20.4 | −4.2905 |
| S8 | Aspheric | 0.9712 | 0.3309 | | | −1.3241 |
| S9 | Spherical | Infinite | 0.2500 | 1.51 | 64.2 | |
| S10 | Spherical | Infinite | 0.4706 | | | |
| S11 | Spherical | Infinite | | | | |

As can be seen from Table 1, the object-side surface and the image-side surface of any one of the first lens E1 to the fourth lens E4 are aspheric. In this example, the surface shape x of each aspheric lens may be defined by using, but not limited to, the following aspheric formula:

$$x = \frac{ch^2}{1+\sqrt{1-(k+1)c^2h^2}} + \sum A_i h^i \qquad (1)$$

Where, x is the sag—the axis-component of the displacement of the surface from the aspheric vertex, when the surface is at height h from the optical axis; c is a paraxial curvature of the aspheric surface, $c=1/R$ (that is, the paraxial curvature c is reciprocal of the radius of curvature R in the above Table 1); k is a conic coefficient (given in the above Table 1); $A_i$ is a correction coefficient for the i-th order of the aspheric surface. Table 2 below shows high-order coefficients A4, A6, A8, A10, A12, A14, A16, A18 and A20 applicable to each aspheric surface S1 to S8 in example 1.

TABLE 2

| Surface number | A4 | A6 | A8 | A10 | A12 |
|---|---|---|---|---|---|
| S1 | 2.3283E−01 | −1.1727E+00 | 7.4559E+00 | −5.0712E+01 | 2.2582E+02 |
| S2 | 4.5588E−01 | −4.3777E+00 | 1.4450E+01 | −2.9451E+01 | 1.5319E+01 |
| S3 | 9.3285E−01 | −5.8615E+00 | 2.8856E+01 | −1.2181E+02 | 3.4950E+02 |
| S4 | 2.3970E−01 | −8.0595E−01 | 4.4129E+00 | −2.6405E+01 | 7.3432E+01 |
| S5 | 1.9934E−02 | −1.2155E+00 | 8.1722E+00 | −2.9215E+01 | 5.7375E+01 |
| S6 | −2.7853E+00 | 1.3881E+01 | −5.2274E+01 | 1.4078E+02 | −2.6036E+02 |
| S7 | −3.4970E−01 | 2.7239E+00 | −1.4771E+01 | 4.5362E+01 | −8.7730E+01 |
| S8 | 2.8520E−01 | −2.7765E+00 | 7.3267E+00 | −1.1748E+01 | 1.2020E+01 |

TABLE 2-continued

| Surface number | A14 | A16 | A18 | A20 |
|---|---|---|---|---|
| S1 | −6.0510E+02 | 9.3986E+02 | −7.8001E+02 | 2.6719E+02 |
| S2 | 7.7591E+01 | −1.9035E+02 | 1.7506E+02 | −5.9463E+01 |
| S3 | −6.6323E+02 | 8.0784E+02 | −5.7186E+02 | 1.7745E+02 |
| S4 | −1.1105E+02 | 9.5883E+01 | −4.4882E+01 | 8.9482E+00 |
| S5 | −6.2617E+01 | 3.7025E+01 | −1.0273E+01 | 7.8009E−01 |
| S6 | 3.1874E+02 | −2.4382E+02 | 1.0478E+02 | −1.9171E+01 |
| S7 | 1.0825E+02 | −8.2882E+01 | 3.5965E+01 | −6.7961E+00 |
| S8 | −7.8191E+00 | 3.0937E+00 | −6.6945E−01 | 5.9245E−02 |

Table 3 shows effective focal lengths f1 to f4 of respective lens, a total effective focal length f of the optical imaging system, a distance TTL along the optical axis from the object-side surface S1 of the first lens E1 to the imaging plane S11, half of a diagonal length ImgH of an effective pixel area on the imaging plane S11, and half of a maximal field-of-view Semi-FOV in example 1.

TABLE 3

| f1 (mm) | −15.76 | f (mm) | 1.88 |
|---|---|---|---|
| f2 (mm) | 2.35 | TTL (mm) | 3.00 |
| f3 (mm) | −4.05 | ImgH (mm) | 1.50 |
| f4 (mm) | 1.90 | Semi-FOV (°) | 40.4 |

Figure 2A:
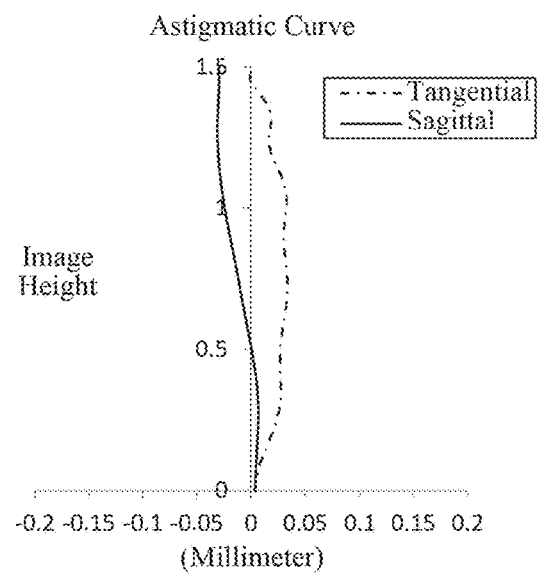
FIGS. 2A and 2C illustrate an astigmatic curve, a distortion curve and a relative illumination curve of the optical imaging system of the example 1, respectively.
Figure 2B:
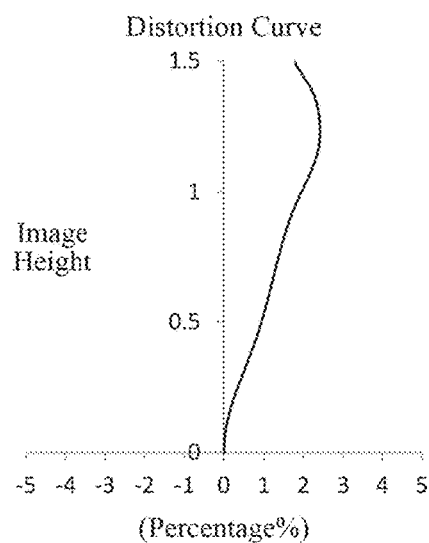
Figure 2C:
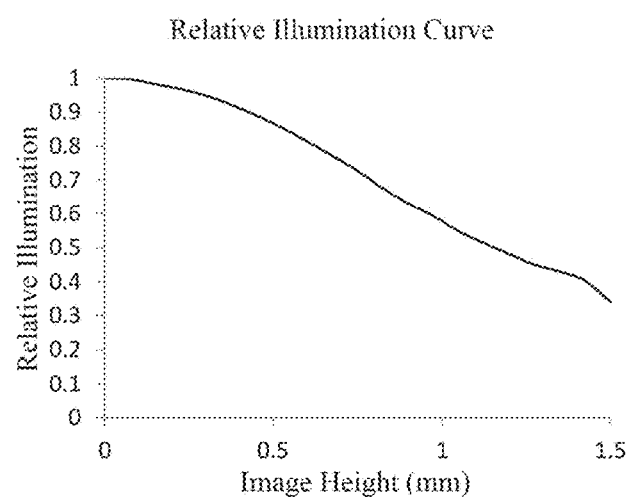

FIG. 2A illustrates an astigmatic curve of the optical imaging system according to example 1, representing a curvature of a tangential plane and a curvature of a sagittal plane. FIG. 2B illustrates a distortion curve of the optical imaging system according to example 1, representing amounts of distortion corresponding to different viewing angles. FIG. 2C illustrates a relative illumination curve of the optical imaging system according to example 1, representing relative illumination corresponding to different image heights on an imaging plane. It can be seen from FIG. 2A to FIG. 2C that the optical imaging system provided in example 1 may achieve good image quality.

Example 2

Figure 3:
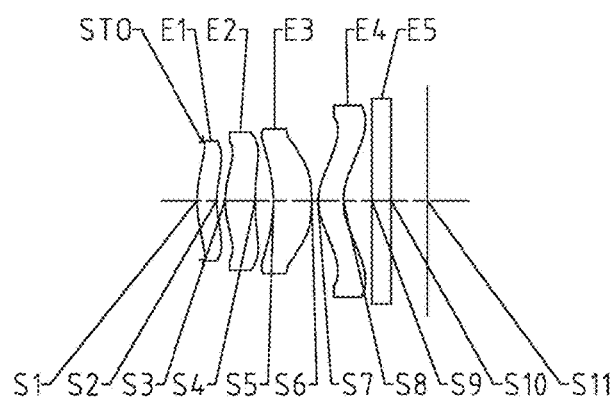
FIG. 3 illustrates a schematic structural view of an optical imaging system according to example 2 of the present disclosure.

An optical imaging system according to example 2 of the present disclosure is described below with reference to FIG. 3 to FIG. 4C. In this example and the following examples, for the purpose of brevity, the description of parts similar to those in example 1 will be omitted. FIG. 3 shows a schematic structural view of the optical imaging system according to example 2 of the present disclosure.

As shown in FIG. 3, the optical imaging system according to an exemplary embodiment of the present disclosure includes a stop STO, a first lens E1, a second lens E2, a third lens E3, a fourth lens E4, an optical filter E5 and an imaging plane S11, which are sequentially arranged from an object side to an image side along an optical axis.

The first lens E1 has negative refractive power, an object-side surface S1 thereof is a convex surface, and an image-side surface S2 thereof is a concave surface. The second lens E2 has positive refractive power, an object-side surface S3 thereof is a convex surface, and an image-side surface S4 thereof is a concave surface. The third lens E3 has negative refractive power, an object-side surface S5 thereof is a concave surface, and an image-side surface S6 thereof is a convex surface. The fourth lens E4 has positive refractive power, an object-side surface S7 thereof is a convex surface, and an image-side surface S8 thereof is a concave surface. The optical filter E5 has an object-side surface S9 and an image-side surface S10. Light from an object sequentially passes through the respective surfaces S1 to S10 and is finally imaged on the imaging plane S11.

The working wavelength band of the optical imaging system in this example is a near-infrared wavelength band with a wavelength ranging from about 900 nm to about 1000 nm.

Table 4 shows surface type, radius of curvature, thickness, material and conic coefficient of each lens of the optical imaging system in example 2, wherein the units for the radius of curvature and the thickness are millimeter (mm).

TABLE 4

| Surface number | Surface type | Radius of curvature | Thickness | Material | | Conic coefficient |
|---|---|---|---|---|---|---|
| | | | | Refractive index | Abbe number | |
| OBJ | Spherical | Infinite | 700.0000 | | | |
| STO | Spherical | Infinite | −0.0787 | | | |
| S1 | Aspheric | 1.4467 | 0.2560 | 1.53 | 56.2 | −18.0958 |
| S2 | Aspheric | 1.1704 | 0.1109 | | | −19.4214 |
| S3 | Aspheric | 1.1720 | 0.3919 | 1.63 | 20.4 | −18.8167 |
| S4 | Aspheric | 4.7221 | 0.2402 | | | −13.0704 |
| S5 | Aspheric | −1.6330 | 0.4970 | 1.53 | 56.2 | −15.2799 |
| S6 | Aspheric | −7.6934 | 0.0808 | | | 39.0814 |
| S7 | Aspheric | 0.5484 | 0.3293 | 1.63 | 20.4 | −6.4917 |
| S8 | Aspheric | 0.8389 | 0.3734 | | | −1.4574 |
| S9 | Spherical | Infinite | 0.2500 | 1.51 | 64.2 | |
| S10 | Spherical | Infinite | 0.4706 | | | |
| S11 | Spherical | Infinite | | | | |

As can be seen from Table 4, in example 2, the object-side surface and the image-side surface of any one of the first lens E1 to the fourth lens E4 are aspheric. Table 5 shows high-order coefficients applicable to each aspheric surface in example 2, wherein the surface shape of each aspheric surface may be defined by the formula (1) given in the above example 1.

TABLE 5

| Surface number | A4 | A6 | A8 | A10 | A12 | A14 | A16 | A18 | A20 |
|---|---|---|---|---|---|---|---|---|---|
| S1 | 8.8973E−02 | 3.3823E+00 | −4.2023E+01 | 2.2248E+02 | −6.2982E+02 | 9.1699E+02 | −4.6514E+02 | −3.1024E+02 | 3.3350E+02 |
| S2 | 1.0816E+00 | −1.5076E+01 | 1.0988E+02 | −5.4361E+02 | 1.7400E+03 | −3.5475E+03 | 4.4529E+03 | −3.1405E+03 | 9.5351E+02 |
| S3 | 1.0271E+00 | −5.4030E+00 | 1.3830E+01 | −7.2276E+00 | −1.2149E+02 | 4.7187E+02 | −7.8004E+02 | 6.1325E+02 | −1.8487E+02 |
| S4 | 3.2622E−01 | −1.7941E+00 | 1.2224E+01 | −6.3513E+01 | 1.7715E+02 | −2.8410E+02 | 2.6477E+02 | −1.3368E+02 | 2.8423E+01 |
| S5 | 4.7392E−02 | −1.5238E+00 | 9.2779E+00 | −3.1326E+01 | 5.8191E+01 | −5.6641E+01 | 2.3441E+01 | 1.8559E+00 | −3.2566E+00 |
| S6 | −3.2521E+00 | 1.7751E+01 | −7.0297E+01 | 1.9471E+02 | −3.6844E+02 | 4.6351E+02 | −3.6804E+02 | 1.6644E+02 | −3.2571E+01 |
| S7 | 4.5335E−01 | −1.8604E+00 | 2.3490E+00 | 2.6889E+00 | −1.4724E+01 | 2.3481E+01 | −1.9072E+01 | 7.9482E+00 | −1.3461E+00 |
| S8 | 2.5559E−02 | −1.9441E+00 | 5.9218E+00 | −1.0039E+01 | 1.0418E+01 | −6.6941E+00 | 2.5688E+00 | −5.3178E−01 | 4.4758E−02 |

Table 6 shows effective focal lengths f1 to f4 of respective lens, a total effective focal length f of the optical imaging system, a distance TTL along the optical axis from the object-side surface S1 of the first lens E1 to the imaging plane S11, half of a diagonal length ImgH of an effective pixel area on the imaging plane S11, and half of a maximal field-of-view Semi-FOV in example 2.

TABLE 6

| f1 (mm) | −17.12 | f (mm) | 1.73 |
|---|---|---|---|
| f2 (mm) | 2.36 | TTL (mm) | 3.00 |
| f3 (mm) | −4.05 | ImgH (mm) | 1.50 |
| f4 (mm) | 1.74 | Semi-FOV (°) | 42.8 |

Figure 4A:
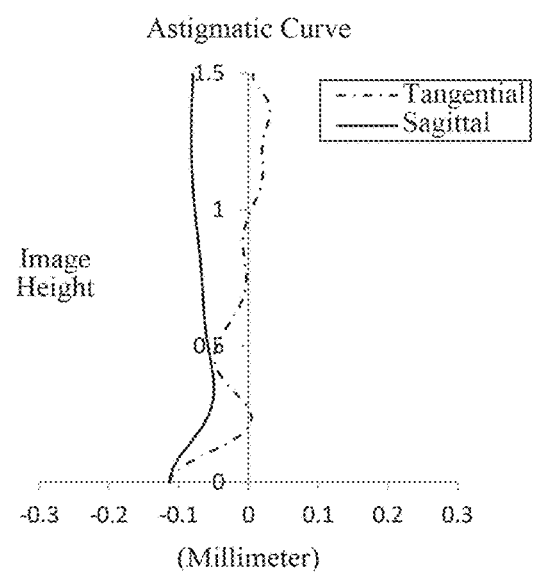
FIGS. 4A to 4C illustrate an astigmatic curve, a distortion curve and a relative illumination curve of the optical imaging system of the example 2, respectively.
Figure 4B:
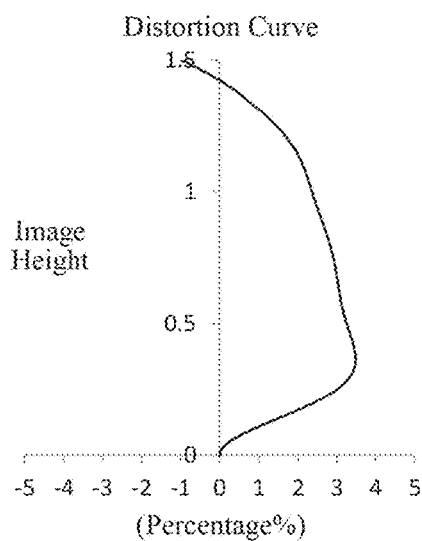
Figure 4C:
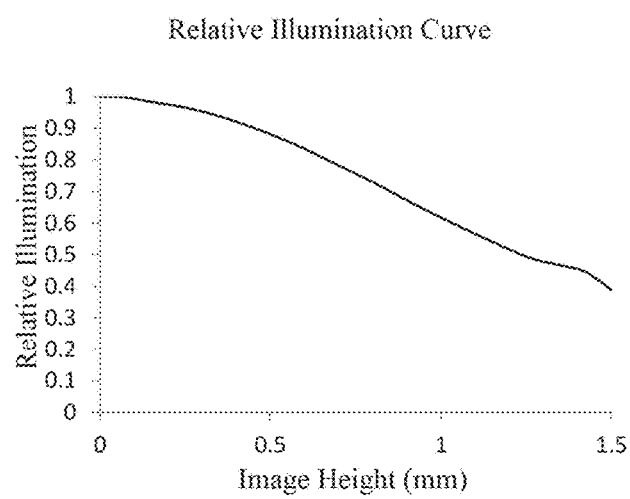

FIG. 4A illustrates an astigmatic curve of the optical imaging system according to example 2, representing a curvature of a tangential plane and a curvature of a sagittal plane. FIG. 4B illustrates a distortion curve of the optical imaging system according to example 2, representing amounts of distortion corresponding to different viewing angles. FIG. 4C illustrates a relative illumination curve of the optical imaging system according to example 2, representing relative illumination corresponding to different image heights on an imaging plane. It can be seen from FIG. 4A to FIG. 4C that the optical imaging system provided in example 2 may achieve good image quality.

Example 3

Figure 5:
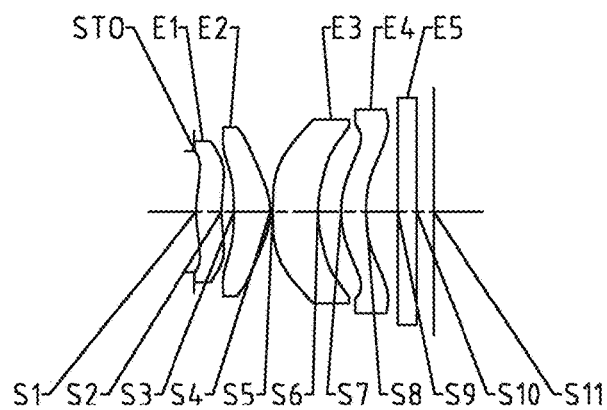
FIG. 5 illustrates a schematic structural view of an optical imaging system according to example 3 of the present disclosure.

An optical imaging system according to example 3 of the present disclosure is described below with reference to FIG. 5 to FIG. 6C. FIG. 5 shows a schematic structural view of the optical imaging system according to example 3 of the present disclosure.

As shown in FIG. 5, the optical imaging system according to an exemplary embodiment of the present disclosure includes a stop STO, a first lens E1, a second lens E2, a third lens E3, a fourth lens E4, an optical filter E5 and an imaging plane S11, which are sequentially arranged from an object side to an image side along an optical axis.

The first lens E1 has negative refractive power, an object-side surface S1 thereof is a convex surface, and an image-side surface S2 thereof is a concave surface. The second lens E2 has positive refractive power, an object-side surface S3 thereof is a concave surface, and an image-side surface S4 thereof is a convex surface. The third lens E3 has negative refractive power, an object-side surface S5 thereof is a convex surface, and an image-side surface S6 thereof is a concave surface. The fourth lens E4 has positive refractive power, an object-side surface S7 thereof is a convex surface, and an image-side surface S8 thereof is a concave surface. The optical filter E5 has an object-side surface S9 and an image-side surface S10. Light from an object sequentially passes through the respective surfaces S1 to S10 and is finally imaged on the imaging plane S11.

The working wavelength band of the optical imaging system in this example is a near-infrared wavelength band with a wavelength ranging from about 900 nm to about 1000 nm.

Table 7 shows surface type, radius of curvature, thickness, material and conic coefficient of each lens of the optical imaging system in example 3, wherein the units for the radius of curvature and the thickness are millimeter (mm).

TABLE 7

| Surface number | Surface type | Radius of curvature | Thickness | Material Refractive index | Material Abbe number | Conic coefficient |
|---|---|---|---|---|---|---|
| OBJ | Spherical | Infinite | 700.0000 | | | |
| STO | Spherical | Infinite | 0.0274 | | | |
| S1 | Aspheric | 1.7100 | 0.3298 | 1.53 | 56.2 | −21.9554 |
| S2 | Aspheric | 1.5300 | 0.1695 | | | −82.8705 |
| S3 | Aspheric | −5.6000 | 0.4813 | 1.63 | 20.4 | −99.0000 |
| S4 | Aspheric | −0.8330 | 0.0300 | | | −4.3224 |
| S5 | Aspheric | 16.6086 | 0.5956 | 1.53 | 56.2 | −99.0000 |
| S6 | Aspheric | 1.3629 | 0.3042 | | | −4.3848 |
| S7 | Aspheric | 1.2771 | 0.3300 | 1.63 | 20.4 | −2.2630 |

TABLE 7-continued

| Surface number | Surface type | Radius of curvature | Thickness | Material Refractive index | Abbe number | Conic coefficient |
|---|---|---|---|---|---|---|
| S8 | Aspheric | 2.4900 | 0.4182 | | | −2.5872 |
| S9 | Spherical | Infinite | 0.2500 | 1.51 | 64.2 | |
| S10 | Spherical | Infinite | 0.2265 | | | |
| S11 | Spherical | Infinite | | | | |

As can be seen from Table 7, in example 3, the object-side surface and the image-side surface of any one of the first lens E1 to the fourth lens E4 are aspheric. Table 8 shows high-order coefficients applicable to each aspheric surface in example 3, wherein the surface shape of each aspheric surface may be defined by the formula (1) given in the above example 1.

TABLE 8

| Surface number | A4 | A6 | A8 | A10 | A12 | A14 | A16 | A18 | A20 |
|---|---|---|---|---|---|---|---|---|---|
| S1 | 2.1907E−01 | −3.2173E+00 | 2.5939E+01 | −1.6080E+02 | 6.1360E+02 | −1.4258E+03 | 1.9573E+03 | −1.4570E+03 | 4.5394E+02 |
| S2 | 1.3184E+00 | −1.4621E+01 | 8.0873E+01 | −2.9977E+02 | 7.1641E+02 | −1.0862E+03 | 1.0102E+03 | −5.2511E+02 | 1.1664E+02 |
| S3 | −6.4539E−01 | 2.3150E−01 | 5.3091E+00 | −2.3339E+01 | 5.2010E+01 | −6.4903E+01 | 4.5161E+01 | −1.6224E+01 | 2.3126E+00 |
| S4 | −7.8000E−02 | −4.3786E−02 | −1.3352E+00 | 1.0970E+01 | −2.8672E+01 | 3.7574E+01 | −2.7131E+01 | 1.0326E+01 | −1.6172E+00 |
| S5 | 8.5573E−01 | −1.5418E+00 | 2.7713E+00 | −4.1868E+00 | 4.7602E+00 | −3.8805E+00 | 2.1664E+00 | −7.4721E−01 | 1.1851E−01 |
| S6 | −2.2313E−01 | 9.9351E−02 | 2.8969E+00 | −1.1798E+01 | 2.5579E+01 | −3.3244E+01 | 2.5687E+01 | −1.0917E+01 | 1.9690E+00 |
| S7 | 1.0339E−01 | 7.0620E−01 | −6.1577E+00 | 2.0661E+01 | −4.0226E+01 | 4.7161E+01 | −3.2653E+01 | 1.2245E+01 | −1.9100E+00 |
| S8 | 6.3495E−01 | −1.5747E+00 | 3.3558E+00 | −6.1184E+00 | 7.3142E+00 | −5.3268E+00 | 2.2607E+00 | −5.0659E−01 | 4.5243E−02 |

Table 9 shows effective focal lengths f1 to f4 of respective lens, a total effective focal length f of the optical imaging system, a distance TTL along the optical axis from the object-side surface S1 of the first lens E1 to the imaging plane S11, half of a diagonal length ImgH of an effective pixel area on the imaging plane S11, and half of a maximal field-of-view Semi-FOV in example 3.

TABLE 9

| f1 (mm) | −74.97 | f (mm) | 1.80 |
|---|---|---|---|
| f2 (mm) | 1.49 | TTL (mm) | 3.14 |
| f3 (mm) | −2.86 | ImgH (mm) | 1.60 |
| f4 (mm) | 3.74 | Semi-FOV (°) | 41.5 |

Figure 6A:
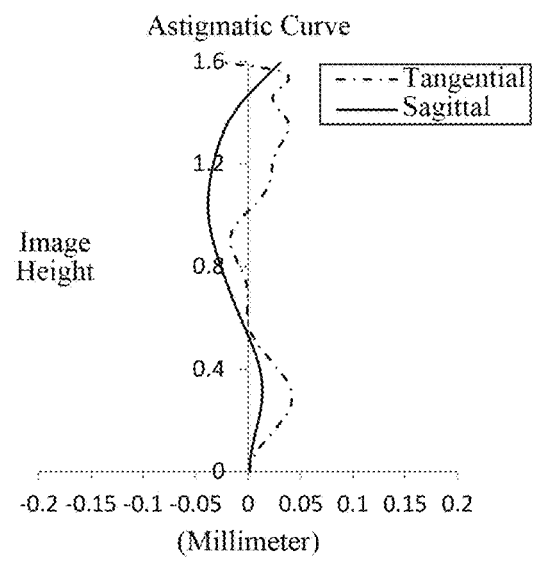
FIGS. 6A to 6C illustrate an astigmatic curve, a distortion curve and a relative illumination curve of the optical imaging system of the example 3, respectively.
Figure 6B:
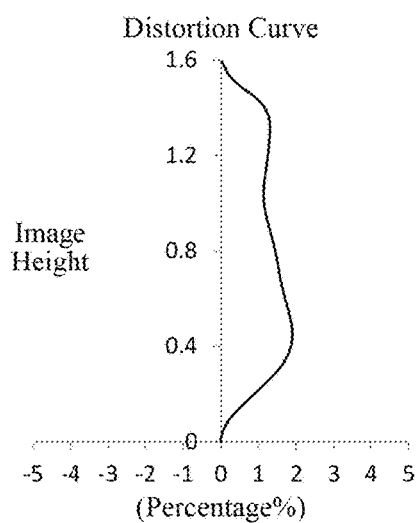
Figure 6C:
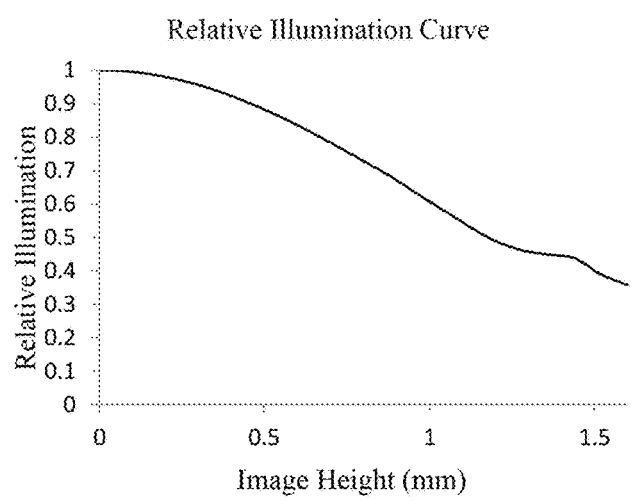

FIG. 6A illustrates an astigmatic curve of the optical imaging system according to example 3, representing a curvature of a tangential plane and a curvature of a sagittal plane. FIG. 6B illustrates a distortion curve of the optical imaging system according to example 3, representing amounts of distortion corresponding to different viewing angles. FIG. 6C illustrates a relative illumination curve of the optical imaging system according to example 3, representing relative illumination corresponding to different image heights on an imaging plane. It can be seen from FIG. 6A to FIG. 6C that the optical imaging system provided in example 3 may achieve good image quality.

Example 4

Figure 7:
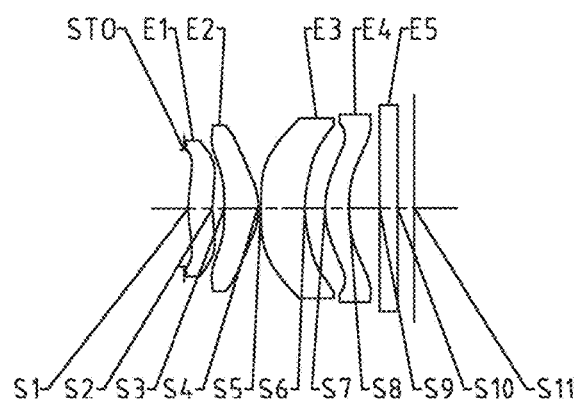
FIG. 7 illustrates a schematic structural view of an optical imaging system according to example 4 of the present disclosure.

An optical imaging system according to example 4 of the present disclosure is described below with reference to FIG. 7 to FIG. 8C. FIG. 7 shows a schematic structural view of the optical imaging system according to example 4 of the present disclosure.

As shown in FIG. 7, the optical imaging system according to an exemplary embodiment of the present disclosure includes a stop STO, a first lens E1, a second lens E2, a third lens E3, a fourth lens E4, an optical filter E5 and an imaging plane S11, which are sequentially arranged from an object side to an image side along an optical axis.

The first lens E1 has negative refractive power, an object-side surface S1 thereof is a convex surface, and an image-side surface S2 thereof is a concave surface. The second lens E2 has positive refractive power, an object-side surface S3 thereof is a concave surface, and an image-side surface S4 thereof is a convex surface. The third lens E3 has negative refractive power, an object-side surface S5 thereof is a concave surface, and an image-side surface S6 thereof is a concave surface. The fourth lens E4 has positive refractive power, an object-side surface S7 thereof is a convex surface, and an image-side surface S8 thereof is a concave surface. The optical filter E5 has an object-side surface S9 and an image-side surface S10. Light from an object sequentially passes through the respective surfaces S1 to S10 and is finally imaged on the imaging plane S11.

The working wavelength band of the optical imaging system in this example is a near-infrared wavelength band with a wavelength ranging from about 900 nm to about 1000 nm.

Table 10 shows surface type, radius of curvature, thickness, material and conic coefficient of each lens of the optical imaging system in example 4, wherein the units for the radius of curvature and the thickness are millimeter (mm).

TABLE 10

| Surface number | Surface type | Radius of curvature | Thickness | Material Refractive index | Abbe number | Conic coefficient |
|---|---|---|---|---|---|---|
| OBJ | Spherical | Infinite | 700.0000 | | | |
| STO | Spherical | Infinite | 0.0553 | | | |
| S1 | Aspheric | 1.7100 | 0.3350 | 1.53 | 56.2 | −18.9010 |
| S2 | Aspheric | 1.5300 | 0.1693 | | | −82.2118 |
| S3 | Aspheric | −5.6000 | 0.4779 | 1.63 | 20.4 | −37.2199 |
| S4 | Aspheric | −0.7676 | 0.0300 | | | −4.2255 |
| S5 | Aspheric | −9.9995 | 0.6070 | 1.53 | 56.2 | −93.9814 |
| S6 | Aspheric | 1.4401 | 0.2823 | | | −4.4313 |
| S7 | Aspheric | 1.3024 | 0.3300 | 1.63 | 20.4 | −1.9079 |
| S8 | Aspheric | 2.6999 | 0.4249 | | | −10.4363 |
| S9 | Spherical | Infinite | 0.2500 | 1.51 | 64.2 | |
| S10 | Spherical | Infinite | 0.2329 | | | |
| S11 | Spherical | Infinite | | | | |

As can be seen from Table 10, in example 4, the object-side surface and the image-side surface of any one of the first lens E1 to the fourth lens E4 are aspheric. Table 11 shows high-order coefficients applicable to each aspheric surface in example 4, wherein the surface shape of each aspheric surface may be defined by the formula (1) given in the above example 1.

TABLE 11

| Surface number | A4 | A6 | A8 | A10 | A12 | A14 | A16 | A18 | A20 |
|---|---|---|---|---|---|---|---|---|---|
| S1 | 1.6515E−01 | −2.8107E+00 | 2.4390E+01 | −1.5718E+02 | 6.0625E+02 | −1.4038E+03 | 1.9013E+03 | −1.3880E+03 | 4.2340E+02 |
| S2 | 1.2627E+00 | −1.4353E+01 | 7.9736E+01 | −2.9989E+02 | 7.2373E+02 | −1.0997E+03 | 1.0176E+03 | −5.2242E+02 | 1.1385E+02 |
| S3 | −6.5812E−01 | −5.3763E−01 | 9.4286E+00 | −3.6454E+01 | 7.9305E+01 | −1.0026E+02 | 7.2440E+01 | −2.7730E+01 | 4.3608E+00 |
| S4 | −7.7158E−02 | −8.6768E−02 | −2.3077E+00 | 1.7280E+01 | −4.3872E+01 | 5.6516E+01 | −4.0207E+01 | 1.5088E+01 | −2.3334E+00 |
| S5 | 1.0596E+00 | −2.1340E+00 | 4.2989E+00 | −7.1771E+00 | 8.7584E+00 | −7.3578E+00 | 4.0315E+00 | −1.3011E+00 | 1.8717E−01 |
| S6 | −1.7835E−01 | −4.3507E−01 | 5.1302E+00 | −1.7392E+01 | 3.4367E+01 | −4.1753E+01 | 3.0527E+01 | −1.2352E+01 | 2.1292E+00 |
| S7 | 2.0745E−01 | 1.2863E−01 | −3.9316E+00 | 1.5041E+01 | −3.1115E+01 | 3.7692E+01 | −2.6559E+01 | 1.0046E+01 | −1.5718E+00 |
| S8 | 7.4256E−01 | −1.5947E+00 | 3.3004E+00 | −6.3527E+00 | 8.0400E+00 | −6.1614E+00 | 2.7582E+00 | −6.6056E−01 | 6.4880E−02 |

Table 12 shows effective focal lengths f1 to f4 of respective lens, a total effective focal length f of the optical imaging system, a distance TTL along the optical axis from the object-side surface S1 of the first lens E1 to the imaging plane S11, half of a diagonal length ImgH of an effective pixel area on the imaging plane S11, and half of a maximal field-of-view Semi-FOV in example 4.

TABLE 12

| f1 (mm) | −77.06 | f (mm) | 1.79 |
|---|---|---|---|
| f2 (mm) | 1.35 | TTL (mm) | 3.14 |
| f3 (mm) | −2.35 | ImgH (mm) | 1.60 |
| f4 (mm) | 3.64 | Semi-FOV (°) | 41.5 |

Figure 8A:
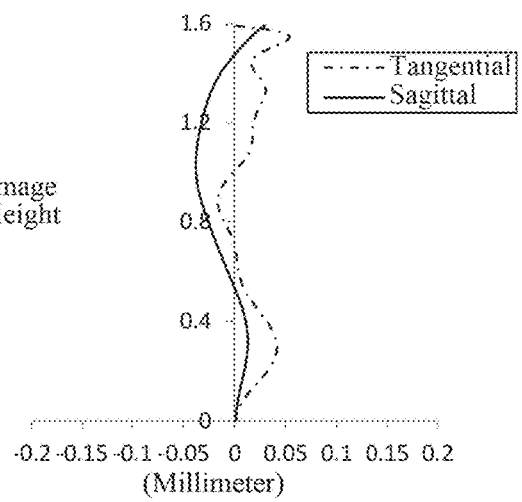
FIGS. 8A to 8C illustrate an astigmatic curve, a distortion curve and a relative illumination curve of the optical imaging system of the example 4, respectively.
Figure 8B:
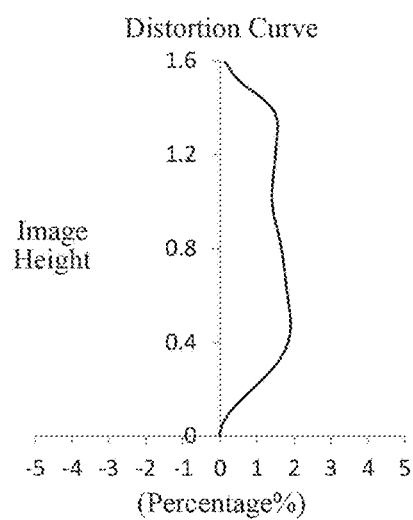
Figure 8C:
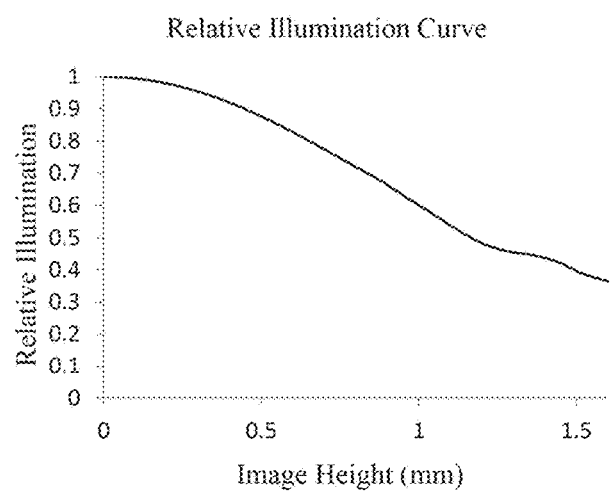

FIG. 8A illustrates an astigmatic curve of the optical imaging system according to example 4, representing a curvature of a tangential plane and a curvature of a sagittal plane. FIG. 8B illustrates a distortion curve of the optical imaging system according to example 4, representing amounts of distortion corresponding to different viewing angles. FIG. 8C illustrates a relative illumination curve of the optical imaging system according to example 4, representing relative illumination corresponding to different image heights on an imaging plane. It can be seen from FIG. 8A to FIG. 8C that the optical imaging system provided in example 4 may achieve good image quality.

Example 5

Figure 9:
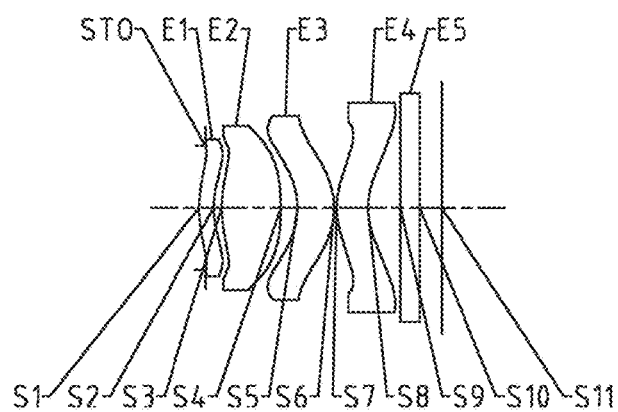
FIG. 9 illustrates a schematic structural view of an optical imaging system according to example 5 of the present disclosure.

An optical imaging system according to example 5 of the present disclosure is described below with reference to FIG. 9 to FIG. 10C. FIG. 9 shows a schematic structural view of the optical imaging system according to example 5 of the present disclosure.

As shown in FIG. 9, the optical imaging system according to an exemplary embodiment of the present disclosure includes a stop STO, a first lens E1, a second lens E2, a third lens E3, a fourth lens E4, an optical filter E5 and an imaging plane S11, which are sequentially arranged from an object side to an image side along an optical axis.

The first lens E1 has negative refractive power, an object-side surface S1 thereof is a convex surface, and an image-side surface S2 thereof is a concave surface. The second lens E2 has positive refractive power, an object-side surface S3 thereof is a convex surface, and an image-side surface S4 thereof is a convex surface. The third lens E3 has positive refractive power, an object-side surface S5 thereof is a concave surface, and an image-side surface S6 thereof is a convex surface. The fourth lens E4 has positive refractive power, an object-side surface S7 thereof is a convex surface, and an image-side surface S8 thereof is a concave surface. The optical filter E5 has an object-side surface S9 and an image-side surface S10. Light from an object sequentially passes through the respective surfaces S1 to S10 and is finally imaged on the imaging plane S11.

The working wavelength band of the optical imaging system of the present example is a near-infrared wavelength band with a wavelength ranging from about 900 nm to about 1000 nm.

Table 13 shows surface type, radius of curvature, thickness, material and conic coefficient of each lens of the optical imaging system in example 5, wherein the units for the radius of curvature and the thickness are millimeter (mm).

TABLE 13

| Surface number | Surface type | Radius of curvature | Thickness | Material Refractive index | Abbe number | Conic coefficient |
|---|---|---|---|---|---|---|
| OBJ | Spherical | Infinite | 700.0000 | | | |
| STO | Spherical | Infinite | −0.0842 | | | |
| S1 | Aspheric | 1.4100 | 0.1878 | 1.53 | 56.2 | −24.1119 |
| S2 | Aspheric | 1.0307 | 0.1053 | | | −6.5501 |
| S3 | Aspheric | 1.6012 | 0.7720 | 1.63 | 20.4 | −21.0715 |
| S4 | Aspheric | −2.5644 | 0.2152 | | | 2.1947 |
| S5 | Aspheric | −0.8933 | 0.4737 | 1.53 | 56.2 | −2.5662 |
| S6 | Aspheric | −0.9377 | 0.0300 | | | −14.0352 |
| S7 | Aspheric | 1.0052 | 0.4061 | 1.63 | 20.4 | −5.5638 |
| S8 | Aspheric | 0.9236 | 0.4230 | | | −0.6087 |
| S9 | Spherical | Infinite | 0.2500 | 1.51 | 64.2 | |
| S10 | Spherical | Infinite | 0.2837 | | | |
| S11 | Spherical | Infinite | | | | |

As can be seen from Table 13, in example 5, the object-side surface and the image-side surface of any one of the first lens E1 to the fourth lens E4 are aspheric. Table 14 shows high-order coefficients applicable to each aspheric surface in example 5, wherein the surface shape of each aspheric surface may be defined by the formula (1) given in the above example 1.

TABLE 14

| Surface number | A4 | A6 | A8 | A10 | A12 | A14 | A16 | A18 | A20 |
|---|---|---|---|---|---|---|---|---|---|
| S1 | 6.9298E−01 | −5.4670E+00 | 2.8499E+01 | −1.0888E+02 | 2.8614E+02 | −5.0317E+02 | 5.6586E+02 | −3.6991E+02 | 1.0744E+02 |
| S2 | 1.5562E−01 | −2.0331E+00 | 1.1861E+01 | −5.7700E+01 | 1.8868E+02 | −4.0074E+02 | 5.1986E+02 | −3.7274E+02 | 1.1381E+02 |
| S3 | 4.7824E−01 | −2.2518E+00 | 7.2487E+00 | −1.6553E+01 | 1.3194E+01 | 3.2668E+01 | −1.0708E+02 | 1.1611E+02 | −4.4085E+01 |
| S4 | −1.8422E−01 | 7.0090E−01 | −4.2121E+00 | 1.4244E+01 | −3.1049E+01 | 4.2572E+01 | −3.4818E+01 | 1.5334E+01 | −2.7493E+00 |
| S5 | −1.1458E−03 | −1.2761E+00 | 5.2697E+00 | −1.3598E+01 | 2.4424E+01 | −2.7466E+01 | 1.8212E+01 | −6.5135E+00 | 9.6950E−01 |
| S6 | −1.6945E+00 | 7.0638E+00 | −2.1474E+01 | 4.5433E+01 | −6.4323E+01 | 6.0172E+01 | −3.5808E+01 | 1.2256E+01 | −1.8271E+00 |
| S7 | 1.0915E+00 | −3.3736E−01 | 2.2921E−03 | 1.5989E+00 | −4.7612E+00 | 7.0327E+00 | −5.8300E+00 | 2.5762E+00 | −4.7652E−01 |
| S8 | −3.0313E−01 | −3.3438E−01 | 1.3986E+00 | −2.6731E+00 | 2.9894E+00 | −2.0541E+00 | 8.4638E−01 | −1.9072E−01 | 1.7823E−02 |

Table 15 shows effective focal lengths f1 to f4 of respective lens, a total effective focal length f of the optical imaging system, a distance TTL along the optical axis from the object-side surface S1 of the first lens E1 to the imaging plane S11, half of a diagonal length ImgH of an effective pixel area on the imaging plane S11, and half of a maximal field-of-view Semi-FOV in example 5.

TABLE 15

| f1 (mm) | −8.79 | f (mm) | 1.78 |
|---|---|---|---|
| f2 (mm) | 1.68 | TTL (mm) | 3.15 |
| f3 (mm) | 13.42 | ImgH (mm) | 1.60 |
| f4 (mm) | 19.29 | Semi-FOV (°) | 41.9 |

Figure 10A:
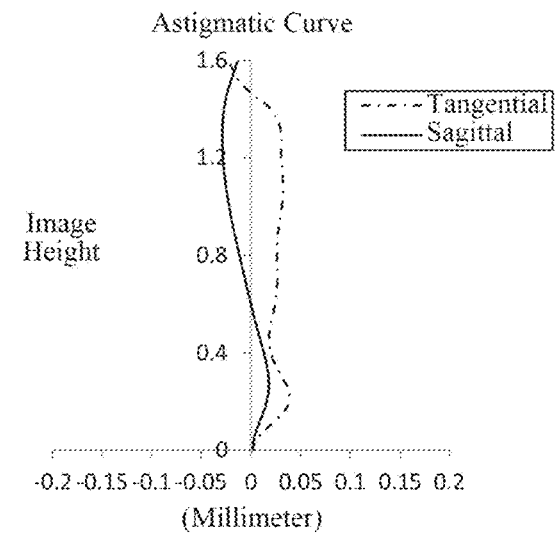
FIGS. 10A to 10C illustrate an astigmatic curve, a distortion curve and a relative illumination curve of the optical imaging system of the example 5, respectively.
Figure 10B:
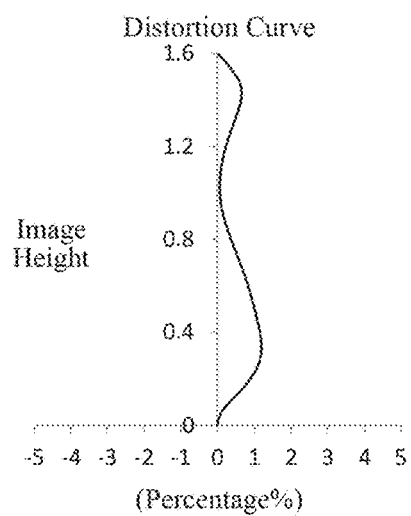
Figure 10C:
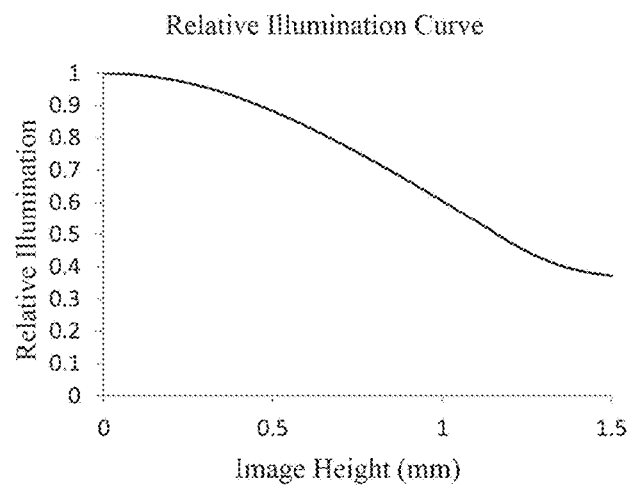

FIG. 10A illustrates an astigmatic curve of the optical imaging system according to example 5, representing a curvature of a tangential plane and a curvature of a sagittal plane. FIG. 10B illustrates a distortion curve of the optical imaging system according to example 5, representing amounts of distortion corresponding to different viewing angles. FIG. 10C illustrates a relative illumination curve of the optical imaging system according to example 5, representing relative illumination corresponding to different image heights on an imaging plane. It can be seen from FIG. 10A to FIG. 10C that the optical imaging system provided in example 5 may achieve good image quality.

Example 6

Figure 11:
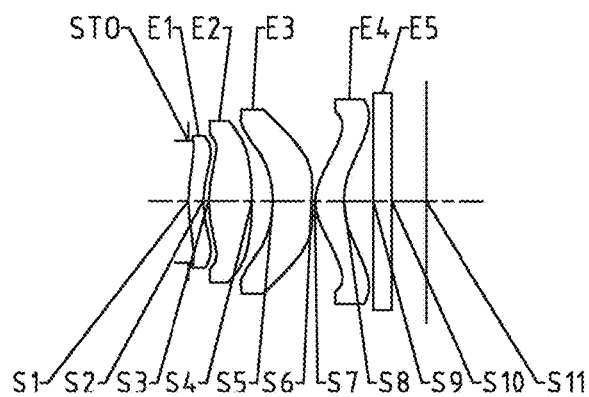
FIG. 11 illustrates a schematic structural view of an optical imaging system according to example 6 of the present disclosure.

An optical imaging system according to example 6 of the present disclosure is described below with reference to FIG. 11 to FIG. 12C. FIG. 11 shows a schematic structural view of the optical imaging system according to example 6 of the present disclosure.

As shown in FIG. 11, the optical imaging system according to an exemplary embodiment of the present disclosure includes a stop STO, a first lens E1, a second lens E2, a third lens E3, a fourth lens E4, an optical filter E5 and an imaging plane S11, which are sequentially arranged from an object side to an image side along an optical axis.

The first lens E1 has negative refractive power, an object-side surface S1 thereof is a convex surface, and an image-side surface S2 thereof is a concave surface. The second lens E2 has positive refractive power, an object-side surface S3 thereof is a convex surface, and an image-side surface S4 thereof is a convex surface. The third lens E3 has negative refractive power, an object-side surface S5 thereof is a concave surface, and an image-side surface S6 thereof is a concave surface. The fourth lens E4 has positive refractive power, an object-side surface S7 thereof is a convex surface, and an image-side surface S8 thereof is a concave surface.

The optical filter E5 has an object-side surface S9 and an image-side surface S10. Light from an object sequentially passes through the respective surfaces S1 to S10 and is finally imaged on the imaging plane S11.

The working wavelength band of the optical imaging system in this example is a near-infrared wavelength band with a wavelength ranging from about 900 nm to about 1000 nm.

Table 16 shows surface type, radius of curvature, thickness, material and conic coefficient of each lens of the optical imaging system in example 6, wherein the units for the radius of curvature and the thickness are millimeter (mm).

TABLE 16

| Surface number | Surface type | Radius of curvature | Thickness | Refractive index | Abbe number | Conic coefficient |
|---|---|---|---|---|---|---|
| OBJ | Spherical | Infinite | 700.0000 | | | |
| STO | Spherical | Infinite | −0.0005 | | | |
| S1 | Aspheric | 1.6969 | 0.2000 | 1.53 | 56.2 | −20.1569 |
| S2 | Aspheric | 1.0000 | 0.0767 | | | −7.1900 |
| S3 | Aspheric | 1.3912 | 0.5874 | 1.63 | 20.4 | −9.0593 |
| S4 | Aspheric | −3.9344 | 0.2854 | | | −17.3116 |
| S5 | Aspheric | −1.2738 | 0.5234 | 1.53 | 56.2 | −0.3753 |
| S6 | Aspheric | 1.0000 | 0.0438 | | | −34.4027 |
| S7 | Aspheric | 0.4456 | 0.4000 | 1.63 | 20.4 | −4.8500 |
| S8 | Aspheric | 1.7731 | 0.3945 | | | −0.0406 |
| S9 | Spherical | Infinite | 0.2500 | 1.51 | 64.2 | |
| S10 | Spherical | Infinite | 0.4752 | | | |
| S11 | Spherical | Infinite | | | | |

As can be seen from Table 16, in example 6, the object-side surface and the image-side surface of any one of the first lens E1 to the fourth lens E4 are aspheric. Table 17 shows high-order coefficients applicable to each aspheric surface in example 6, wherein the surface shape of each aspheric surface may be defined by the formula (1) given in the above example 1.

TABLE 17

| Surface number | A4 | A6 | A8 | A10 | A12 | A14 | A16 | A18 | A20 |
|---|---|---|---|---|---|---|---|---|---|
| S1 | 1.8972E−02 | −6.5223E−01 | 1.8389E+00 | 2.0770E+00 | −3.3233E+01 | 9.9426E+01 | −1.3514E+02 | 8.0737E+01 | −1.3602E+01 |
| S2 | −3.0278E−02 | −1.6721E+00 | 1.3385E+01 | −7.3490E+01 | 2.4931E+02 | −5.3587E+02 | 7.0478E+02 | −5.1553E+02 | 1.6050E+02 |
| S3 | 1.6866E−01 | −1.5581E+00 | 9.9777E+00 | −4.7889E+01 | 1.4664E+02 | −2.9388E+02 | 3.6816E+02 | −2.6076E+02 | 7.9540E+01 |
| S4 | −1.8587E−01 | 8.4836E−01 | −5.1132E+00 | 1.8921E+01 | −4.5331E+01 | 6.7410E+01 | −5.9603E+01 | 2.8635E+01 | −5.7427E+00 |
| S5 | 3.6438E−02 | −1.1206E+00 | 4.9702E+00 | −1.4778E+01 | 2.8109E+01 | −3.1857E+01 | 2.1075E+01 | −7.5548E+00 | 1.1362E+00 |
| S6 | −3.3025E+00 | 1.1442E+01 | −2.8085E+01 | 4.8103E+01 | −5.6503E+01 | 4.4371E+01 | −2.2142E+01 | 6.3155E+00 | −7.7928E−01 |
| S7 | 6.4936E−01 | −2.6386E+00 | 5.6049E+00 | −8.1155E+00 | 8.8139E+00 | −7.7358E+00 | 5.1159E+00 | −2.1029E+00 | 3.8006E−01 |
| S8 | 1.8898E+00 | −8.3985E+00 | 1.9618E+01 | −2.9162E+01 | 2.8329E+01 | −1.7927E+01 | 7.1229E+00 | −1.6148E+00 | 1.5952E−01 |

Table 18 shows effective focal lengths f1 to f4 of respective lens, a total effective focal length f of the optical imaging system, a distance TTL along the optical axis from the object-side surface S1 of the first lens E1 to the imaging plane S11, half of a diagonal length ImgH of an effective pixel area on the imaging plane S11, and half of a maximal field-of-view Semi-FOV in example 6.

TABLE 18

| f1 (mm) | −5.14 | f (mm) | 1.79 |
| f2 (mm) | 1.69 | TTL (mm) | 3.24 |
| f3 (mm) | −0.99 | ImgH (mm) | 1.60 |
| f4 (mm) | 0.84 | Semi-FOV (°) | 41.7 |

Figure 12A:
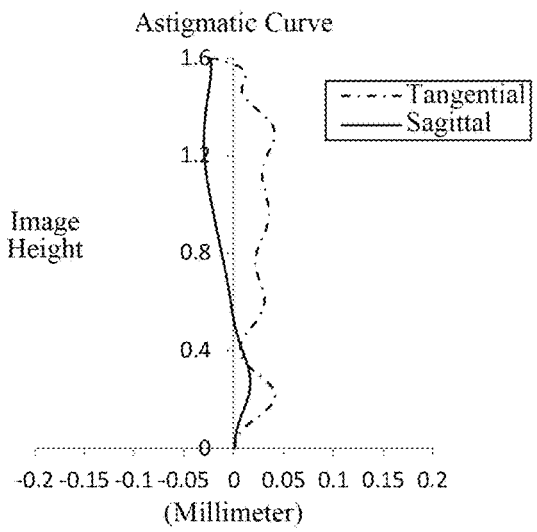
FIGS. 12A to 12C illustrate an astigmatic curve, a distortion curve and a relative illumination curve of the optical imaging system of the example 6, respectively.
Figure 12B:
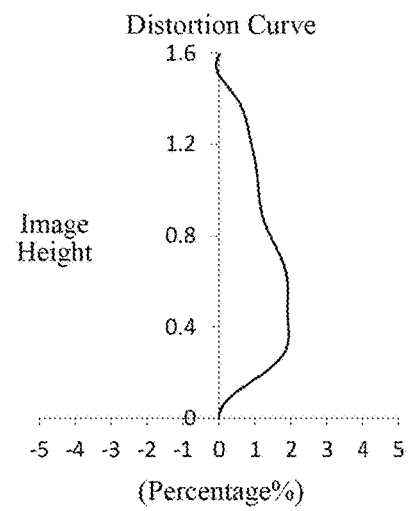
Figure 12C:
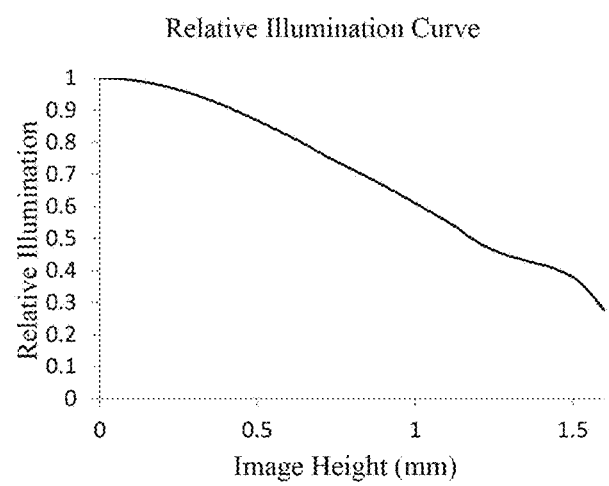

FIG. 12A illustrates an astigmatic curve of the optical imaging system according to example 6, representing a curvature of a tangential plane and a curvature of a sagittal plane. FIG. 12B illustrates a distortion curve of the optical imaging system according to example 6, representing amounts of distortion corresponding to different viewing angles. FIG. 12C illustrates a relative illumination curve of the optical imaging system according to example 6, representing relative illumination corresponding to different image heights on an imaging plane. It can be seen from FIG. 12A to FIG. 12C that the optical imaging system provided in example 6 may achieve good image quality.

Example 7

Figure 13:
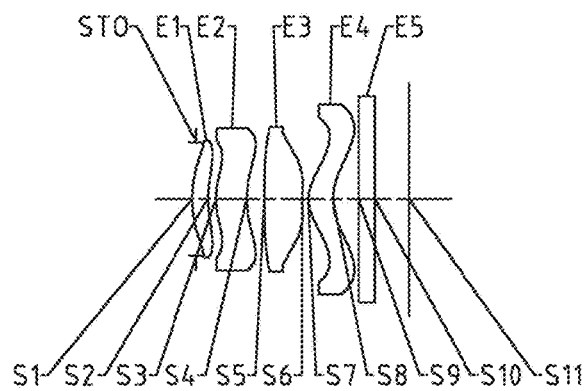
FIG. 13 illustrates a schematic structural view of an optical imaging system according to example 7 of the present disclosure.

An optical imaging system according to example 7 of the present disclosure is described below with reference to FIG. 13 to FIG. 14C. FIG. 13 shows a schematic structural view of the optical imaging system according to example 7 of the present disclosure.

As shown in FIG. 13, the optical imaging system according to an exemplary embodiment of the present disclosure includes a stop STO, a first lens E1, a second lens E2, a third lens E3, a fourth lens E4, an optical filter E5 and an imaging plane S11, which are sequentially arranged from an object side to an image side along an optical axis.

The first lens E1 has negative refractive power, an object-side surface S1 thereof is a convex surface, and an image-side surface S2 thereof is a concave surface. The second lens E2 has positive refractive power, an object-side surface S3 thereof is a convex surface, and an image-side surface S4 thereof is a concave surface. The third lens E3 has negative refractive power, an object-side surface S5 thereof is a convex surface, and an image-side surface S6 thereof is a concave surface. The fourth lens E4 has positive refractive power, an object-side surface S7 thereof is a convex surface, and an image-side surface S8 thereof is a concave surface. The optical filter E5 has an object-side surface S9 and an image-side surface S10. Light from an object sequentially passes through the respective surfaces S1 to S10 and is finally imaged on the imaging plane S11.

The working wavelength band of the optical imaging system in this example is a near-infrared wavelength band with a wavelength ranging from about 900 nm to about 1000 nm.

Table 19 shows surface type, radius of curvature, thickness, material and conic coefficient of each lens of the optical imaging system in example 7, wherein the units for the radius of curvature and the thickness are millimeter (mm).

TABLE 19

| Surface number | Surface type | Radius of curvature | Thickness | Material Refractive index | Material Abbe number | Conic coefficient |
| --- | --- | --- | --- | --- | --- | --- |
| OBJ | Spherical | Infinite | 700.0000 | | | |
| STO | Spherical | Infinite | −0.0582 | | | |
| S1 | Aspheric | 1.4305 | 0.2169 | 1.53 | 56.2 | −8.6391 |
| S2 | Aspheric | 1.1587 | 0.1109 | | | −25.2677 |
| S3 | Aspheric | 1.0213 | 0.4204 | 1.63 | 20.4 | −5.1297 |
| S4 | Aspheric | 1.4049 | 0.2402 | | | −30.2415 |
| S5 | Aspheric | 50.0000 | 0.5207 | 1.53 | 56.2 | −99.0000 |
| S6 | Aspheric | 1.4017 | 0.0808 | | | −76.3521 |
| S7 | Aspheric | 0.4533 | 0.3368 | 1.63 | 20.4 | −4.9727 |
| S8 | Aspheric | 0.9550 | 0.3526 | | | −0.8635 |
| S9 | Spherical | Infinite | 0.2200 | 1.51 | 64.2 | |
| S10 | Spherical | Infinite | 0.4706 | | | |
| S11 | Spherical | Infinite | | | | |

As can be seen from Table 19, in example 7, the object-side surface and the image-side surface of any one of the first lens E1 to the fourth lens E4 are aspheric. Table 20 shows high-order coefficients applicable to each aspheric surface in example 7, wherein the surface shape of each aspheric surface may be defined by the formula (1) given in the above example 1.

TABLE 20

| Surface number | A4 | A6 | A8 | A10 | A12 | A14 | A16 | A18 | A20 |
|---|---|---|---|---|---|---|---|---|---|
| S1 | 5.9227E−02 | −5.1047E−01 | 1.0064E+01 | −6.9246E+01 | 2.6102E+02 | −5.8798E+02 | 7.8378E+02 | −5.6919E+02 | 1.7164E+02 |
| S2 | 5.9878E−01 | −7.9692E+00 | 4.6585E+01 | −1.7677E+02 | 4.4039E+02 | −7.1140E+02 | 7.1147E+02 | −3.9834E+02 | 9.4338E+01 |
| S3 | −2.7231E−01 | 5.0512E−01 | −7.8240E+00 | 3.5799E+01 | −1.0003E+02 | 1.8026E+02 | −2.0317E+02 | 1.2774E+02 | −3.3072E+01 |
| S4 | 1.0279E+00 | −4.6251E+00 | 1.2796E+01 | −2.8771E+01 | 5.0656E+01 | −6.3759E+01 | 5.0755E+01 | −2.2284E+01 | 4.0722E+00 |
| S5 | 2.3215E−02 | 1.0923E+00 | −6.8997E+00 | 2.4556E+01 | −5.6248E+01 | 8.3827E+01 | −7.7512E+01 | 3.9787E+01 | −8.5677E+00 |
| S6 | −3.0912E+00 | 1.3425E+01 | −4.4516E+01 | 1.0754E+02 | −1.8010E+02 | 1.9990E+02 | −1.3755E+02 | 5.2170E+01 | −8.1419E+00 |
| S7 | 1.0565E+00 | −5.3786E+00 | 1.4552E+01 | −2.9684E+01 | 4.5192E+01 | −4.8154E+01 | 3.3073E+01 | −1.2976E+01 | 2.1926E+00 |
| S8 | 1.0946E+00 | −6.7129E+00 | 1.6618E+01 | −2.5851E+01 | 2.6631E+01 | −1.8153E+01 | 7.8760E+00 | −1.9704E+00 | 2.1627E−01 |

Table 21 shows effective focal lengths f1 to f4 of respective lens, a total effective focal length f of the optical imaging system, a distance TTL along the optical axis from the object-side surface S1 of the first lens E1 to the imaging plane S11, half of a diagonal length ImgH of an effective pixel area on the imaging plane S11, and half of a maximal field-of-view Semi-FOV in example 7.

TABLE 21

| f1 (mm) | −16.01 | f (mm) | 1.78 |
|---|---|---|---|
| f2 (mm) | 4.14 | TTL (mm) | 2.97 |
| f3 (mm) | −2.75 | ImgH (mm) | 1.60 |
| f4 (mm) | 1.08 | Semi-FOV (°) | 41.7 |

Figure 14A:
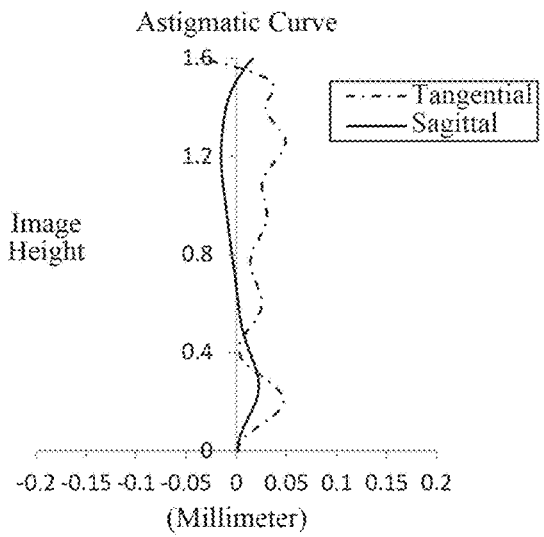
FIGS. 14A to 14C illustrate an astigmatic curve, a distortion curve and a relative illumination curve of the optical imaging system of the example 7, respectively.
Figure 14B:
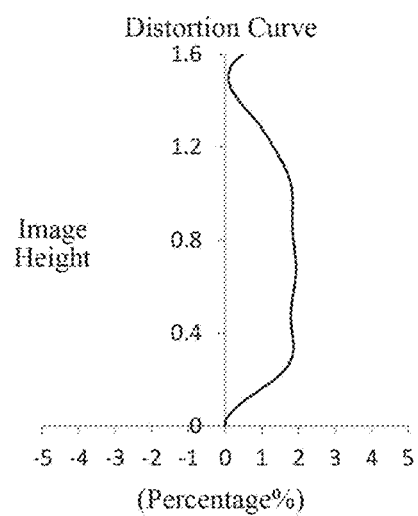
Figure 14C:
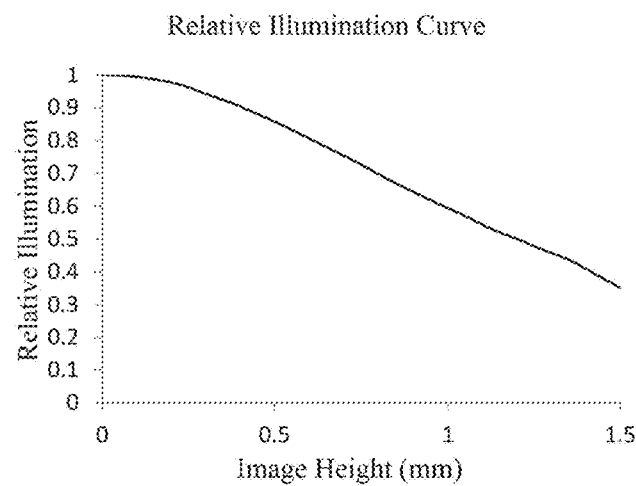

FIG. 14A illustrates an astigmatic curve of the optical imaging system according to example 7, representing a curvature of a tangential plane and a curvature of a sagittal plane. FIG. 14B illustrates a distortion curve of the optical imaging system according to example 7, representing amounts of distortion corresponding to different viewing angles. FIG. 14C illustrates a relative illumination curve of the optical imaging system according to example 7, representing relative illumination corresponding to different image heights on an imaging plane. It can be seen from FIG. 14A to FIG. 14C that the optical imaging system provided in example 7 may achieve good image quality.

Example 8

Figure 15:
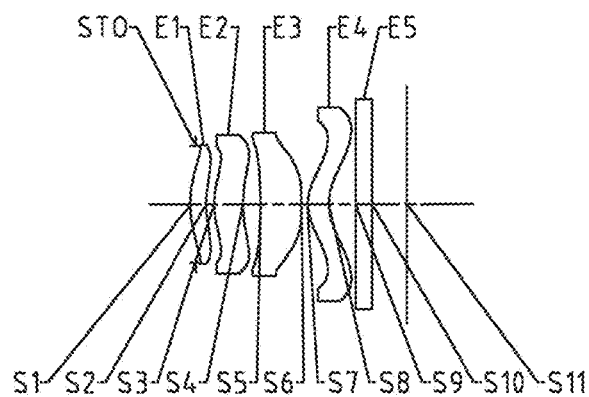
FIG. 15 illustrates a schematic structural view of an optical imaging system according to example 8 of the present disclosure.

An optical imaging system according to example 8 of the present disclosure is described below with reference to FIG. 15 to FIG. 16C. FIG. 15 shows a schematic structural view of the optical imaging system according to example 8 of the present disclosure.

As shown in FIG. 15, the optical imaging system according to an exemplary embodiment of the present disclosure includes a stop STO, a first lens E1, a second lens E2, a third lens E3, a fourth lens E4, an optical filter E5 and an imaging plane S11, which are sequentially arranged from an object side to an image side along an optical axis.

The first lens E1 has negative refractive power, an object-side surface S1 thereof is a convex surface, and an image-side surface S2 thereof is a concave surface. The second lens E2 has positive refractive power, an object-side surface S3 thereof is a convex surface, and an image-side surface S4 thereof is a concave surface. The third lens E3 has negative refractive power, an object-side surface S5 thereof is a concave surface, and an image-side surface S6 thereof is a concave surface. The fourth lens E4 has positive refractive power, an object-side surface S7 thereof is a convex surface, and an image-side surface S8 thereof is a concave surface. The optical filter E5 has an object-side surface S9 and an image-side surface S10. Light from an object sequentially passes through the respective surfaces S1 to S10 and is finally imaged on the imaging plane S11.

The working wavelength band of the optical imaging system in this example is a near-infrared wavelength band with a wavelength ranging from about 900 nm to about 1000 nm.

Table 22 shows surface type, radius of curvature, thickness, material and conic coefficient of each lens of the optical imaging system in example 8, wherein the units for the radius of curvature and the thickness are millimeter (mm).

TABLE 22

| | | | | Material | | |
|---|---|---|---|---|---|---|
| Surface number | Surface type | Radius of curvature | Thickness | Refractive index | Abbe number | Conic coefficient |
| OBJ | Spherical | Infinite | 700.0000 | | | |
| STO | Spherical | Infinite | −0.0787 | | | |
| S1 | Aspheric | 1.4100 | 0.2145 | 1.53 | 56.2 | −10.5245 |
| S2 | Aspheric | 1.1463 | 0.1109 | | | −23.4620 |
| S3 | Aspheric | 1.0508 | 0.3919 | 1.63 | 20.4 | −13.7705 |
| S4 | Aspheric | 1.8263 | 0.2402 | | | −13.0487 |
| S5 | Aspheric | −4.6309 | 0.5564 | 1.53 | 56.2 | −99.0000 |
| S6 | Aspheric | 10.0000 | 0.0808 | | | −99.0000 |
| S7 | Aspheric | 0.5221 | 0.2902 | 1.63 | 20.4 | −4.7484 |

TABLE 22-continued

| Surface number | Surface type | Radius of curvature | Thickness | Material Refractive index | Abbe number | Conic coefficient |
|---|---|---|---|---|---|---|
| S8 | Aspheric | 0.8362 | 0.3671 | | | −0.9976 |
| S9 | Spherical | Infinite | 0.2200 | 1.51 | 64.2 | |
| S10 | Spherical | Infinite | 0.4706 | | | |
| S11 | Spherical | Infinite | | | | |

As can be seen from Table 22, in example 8, the object-side surface and the image-side surface of any one of the first lens E1 to the fourth lens E4 are aspheric. Table 23 shows high-order coefficients applicable to each aspheric surface in example 8, wherein the surface shape of each aspheric surface may be defined by the formula (1) given in the above example 1.

TABLE 23

| Surface number | A4 | A6 | A8 | A10 | A12 | A14 | A16 | A18 | A20 |
|---|---|---|---|---|---|---|---|---|---|
| S1 | 1.8836E−01 | −1.4805E+00 | 1.3164E+01 | −7.3771E+01 | 2.5541E+02 | −5.5555E+02 | 7.3568E+02 | −5.4216E+02 | 1.6933E+02 |
| S2 | 6.9891E−01 | −8.3021E+00 | 4.4206E+01 | −1.5515E+02 | 3.5131E+02 | −4.9527E+02 | 4.0205E+02 | −1.5714E+02 | 1.5554E+01 |
| S3 | 8.5071E−01 | −7.0930E+00 | 3.7997E+01 | −1.7583E+02 | 5.8199E+02 | −1.2839E+03 | 1.7808E+03 | −1.3977E+03 | 4.7030E+02 |
| S4 | 3.1880E−01 | −7.0883E−01 | −1.4903E+00 | 3.3567E+00 | 6.1753E+00 | −2.9725E+01 | 4.0641E+01 | −2.4386E+01 | 5.5314E+00 |
| S5 | 3.0128E−01 | −3.1529E+00 | 2.0213E+01 | −8.5020E+01 | 2.2306E+02 | −3.6438E+02 | 3.5696E+02 | −1.9021E+02 | 4.2193E+01 |
| S6 | −3.2469E+00 | 1.4948E+01 | −5.0691E+01 | 1.1851E+02 | −1.8291E+02 | 1.7694E+02 | −9.7756E+01 | 2.4924E+01 | −1.0824E+00 |
| S7 | 6.8918E−01 | −3.3884E+00 | 7.9096E+00 | −1.4613E+01 | 2.2858E+01 | −2.7353E+01 | 2.1565E+01 | −9.6126E+00 | 1.8105E+00 |
| S8 | 6.9917E−01 | −5.4904E+00 | 1.4463E+01 | −2.3281E+01 | 2.4479E+01 | −1.6904E+01 | 7.4058E+00 | −1.8708E+00 | 2.0779E−01 |

Table 24 shows effective focal lengths f1 to f4 of respective lens, a total effective focal length f of the optical imaging system, a distance TTL along the optical axis from the object-side surface S1 of the first lens E1 to the imaging plane S11, half of a diagonal length ImgH of an effective pixel area on the imaging plane S11, and half of a maximal field-of-view Semi-FOV in example 8.

TABLE 24

| f1 (mm) | −16.20 | f (mm) | 1.79 |
|---|---|---|---|
| f2 (mm) | 3.27 | TTL (mm) | 2.94 |
| f3 (mm) | −5.95 | ImgH (mm) | 1.60 |
| f4 (mm) | 1.61 | Semi-FOV (°) | 41.7 |

Figure 16A:
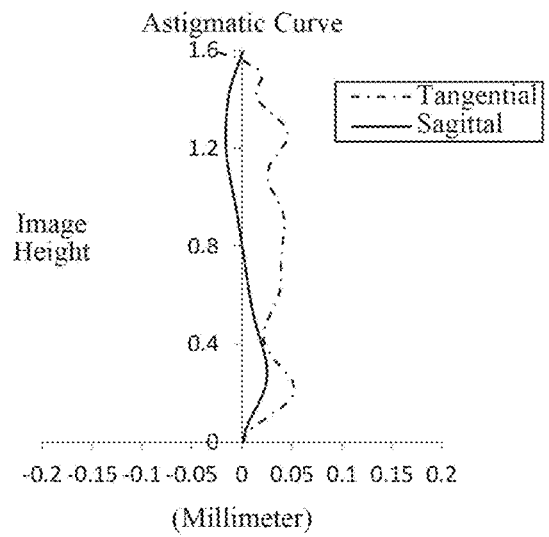
FIGS. 16A to 16C illustrate an astigmatic curve, a distortion curve and a relative illumination curve of the optical imaging system of the example 8, respectively.
Figure 16B:
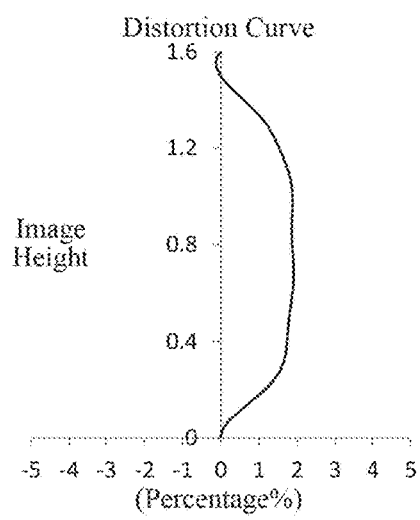
Figure 16C:
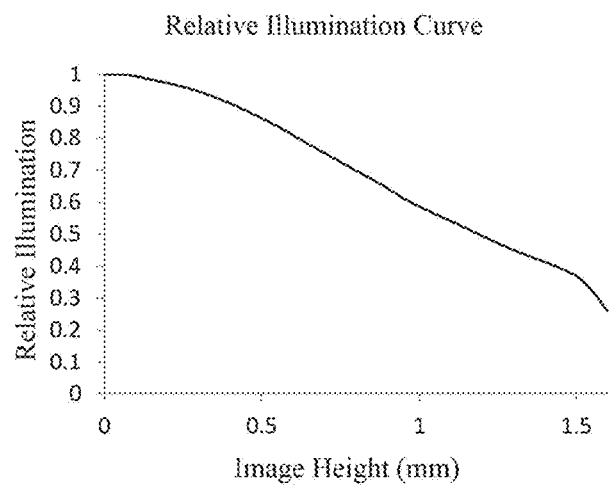

FIG. 16A illustrates an astigmatic curve of the optical imaging system according to example 8, representing a curvature of a tangential plane and a curvature of a sagittal plane. FIG. 16B illustrates a distortion curve of the optical imaging system according to example 8, representing amounts of distortion corresponding to different viewing angles. FIG. 16C illustrates a relative illumination curve of the optical imaging system according to example 8, representing relative illumination corresponding to different image heights on an imaging plane. It can be seen from FIG. 16A to FIG. 16C that the optical imaging system provided in example 8 may achieve good image quality.

In view of the above, examples 1 to 8 respectively satisfy the relationship shown in Table 25.

TABLE 25

| Conditional\Example | 1 | 2 | 3 | 4 | 5 | 6 | 7 | 8 |
|---|---|---|---|---|---|---|---|---|
| Fno | 1.13 | 1.13 | 1.13 | 1.13 | 1.13 | 1.13 | 1.13 | 1.13 |
| λ * tanθ (μm) | 0.80 | 0.87 | 0.83 | 0.83 | 0.84 | 0.84 | 0.84 | 0.84 |
| TTL/ImgH | 2.00 | 2.00 | 1.96 | 1.96 | 1.97 | 2.02 | 1.86 | 1.84 |
| CT4/ET4 | 1.07 | 1.00 | 0.81 | 0.82 | 0.68 | 1.02 | 1.10 | 0.97 |
| CT2/CT3 | 0.86 | 0.79 | 0.81 | 0.79 | 1.63 | 1.12 | 0.81 | 0.70 |
| CT1/(T12 * 2) | 1.48 | 1.15 | 0.97 | 0.99 | 0.89 | 1.30 | 0.98 | 0.97 |
| f2/f | 1.25 | 1.37 | 0.83 | 0.75 | 0.94 | 0.95 | 2.32 | 1.82 |
| R1/R2 | 1.27 | 1.24 | 1.12 | 1.12 | 1.37 | 1.70 | 1.23 | 1.23 |
| R7/R8 | 0.63 | 0.65 | 0.51 | 0.48 | 1.09 | 0.25 | 0.47 | 0.62 |
| SAG21/SAG42 | −0.56 | −0.43 | −0.26 | −0.31 | −0.08 | −0.03 | 0.14 | −0.36 |

The present disclosure further provides an imaging apparatus, having an electronic photosensitive element which may be a photosensitive Charge-Coupled Device (CCD) or a Complementary Metal-Oxide Semiconductor (CMOS). The imaging apparatus may be an independent imaging device such as a digital camera, or may be an imaging module integrated in a mobile electronic device, such as a mobile phone. The imaging apparatus is equipped with the optical imaging system described above.

The foregoing is only a description of the preferred examples of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical imaging system, comprising, sequentially from an object side to an image side along an optical axis, a first lens, a second lens, a third lens and a fourth lens, wherein,
the first lens has negative refractive power, a convex object-side surface, and a concave image-side surface;
the second lens has refractive power;
the third lens has refractive power; and
the fourth lens has positive refractive power, a convex object-side surface, and a concave image-side surface,
wherein 0.5 µm<λ*tan θ<1.0 µm, where λ is a wavelength of a chief ray of the optical imaging system, and tan θ is a tangent of a half field-of-view of the optical imaging system.

2. The optical imaging system according to claim 1, wherein Fno<1.3,
where Fno is a relative F number of the optical imaging system.

3. The optical imaging system according to claim 1, wherein 0.5<CT4/ET4<1.5,
where CT4 is a center thickness of the fourth lens along the optical axis, and ET4 is an edge thickness of the fourth lens.

4. The optical imaging system according to claim 1, wherein 0.7≤CT2/CT3≤1.7,
where CT2 is a center thickness of the second lens along the optical axis, and CT3 is a center thickness of the third lens along the optical axis.

5. The optical imaging system according to claim 1, wherein 0.5<CT1/(T12*2)<2.5,
where CT1 is a center thickness of the first lens along the optical axis, and T12 is a spaced interval between the first lens and the second lens along the optical axis.

6. The optical imaging system according to claim 1, wherein the second lens has positive refractive power, and 0.5<f2/f≤2.5, where f2 is an effective focal length of the second lens, and f is a total effective focal length of the optical imaging system.

7. The optical imaging system according to claim 1, wherein 1.0<R1/R2≤2.0,
where R1 is a radius of curvature of the object-side surface of the first lens, and R2 is a radius of curvature of the image-side surface of the first lens.

8. The optical imaging system according to claim 1, wherein 0<R7/R8<1.5,
where R7 is a radius of curvature of the object-side surface of the fourth lens, and R8 is a radius of curvature of the image-side surface of the fourth lens.

9. The optical imaging system according to claim 1, wherein −1.5<SAG21/SAG42<0.5,
where SAG21 is an on-axis distance from an intersection of an object-side surface of the second lens and the optical axis to a vertex of an effective half-aperture of the object-side surface of the second lens, and SAG42 is an on-axis distance from an intersection of the image-side surface of the fourth lens and the optical axis to a vertex of an effective half-aperture of the image-side surface of the fourth lens.

10. The optical imaging system according to claim 1, wherein 1.5<TTL/ImgH<2.5,
where TTL is a distance along the optical axis from the object-side surface of the first lens to an imaging plane of the optical imaging system, and ImgH is half of a diagonal length of an effective pixel area on the imaging plane of the optical imaging system.

11. The optical imaging system according to claim 1, wherein a working wavelength band of the optical imaging system is in a range of 900 nm to 1000 nm.

12. An optical imaging system, comprising, sequentially from an object side to an image side along an optical axis, a first lens, a second lens, a third lens and a fourth lens, wherein,
the first lens has negative refractive power, a convex object-side surface, and a concave image-side surface;
the second lens has refractive power;
the third lens has refractive power; and
the fourth lens has positive refractive power, a convex object-side surface, and a concave image-side surface,
wherein 1.5<TTL/ImgH<2.5, where TTL is a distance along the optical axis from the object-side surface of the first lens to an imaging plane of the optical imaging system, and ImgH is half of a diagonal length of an effective pixel area on the imaging plane of the optical imaging system.

13. The optical imaging system according to claim 12, wherein 0.5<CT4/ET4<1.5,
where CT4 is a center thickness of the fourth lens along the optical axis, and ET4 is an edge thickness of the fourth lens.

14. The optical imaging system according to claim 12, wherein 0.7≤CT2/CT3≤1.7,
where CT2 is a center thickness of the second lens along the optical axis, and CT3 is a center thickness of the third lens along the optical axis.

15. The optical imaging system according to claim 12, wherein 0.5<CT1/(T12*2)<2.5,
where CT1 is a center thickness of the first lens along the optical axis, and T12 is a spaced interval between the first lens and the second lens along the optical axis.

16. The optical imaging system according to claim 12, wherein the second lens has positive refractive power, and 0.5<f2/f≤2.5, where f2 is an effective focal length of the second lens, and f is a total effective focal length of the optical imaging system.

17. The optical imaging system according to claim 12, wherein 1.0<R1/R2≤2.0,
where R1 is a radius of curvature of the object-side surface of the first lens, and R2 is a radius of curvature of the image-side surface of the first lens.

18. The optical imaging system according to claim 12, wherein −1.5<SAG21/SAG42<0.5,
where SAG21 is an on-axis distance from an intersection of an object-side surface of the second lens and the optical axis to a vertex of an effective half-aperture of the object-side surface of the second lens, and SAG42 is an on-axis distance from an intersection of the image-side surface of the fourth lens and the optical axis to a vertex of an effective half-aperture of the image-side surface of the fourth lens.

19. The optical imaging system according to claim 12, wherein a working wavelength band of the optical imaging system is in the range of 900 nm to 1000 nm.

20. The optical imaging system according to claim 12, wherein Fno<1.3,
where Fno is a relative F number of the optical imaging system.

* * * * *